(12) United States Patent
Tarta et al.

(10) Patent No.: US 9,106,480 B2
(45) Date of Patent: *Aug. 11, 2015

(54) PERFORMING COMPUTATIONS IN A DISTRIBUTED INFRASTRUCTURE

(71) Applicant: Microsoft Corporation, Redmond, WA (US)

(72) Inventors: Mihail Gavril Tarta, Sammamish, WA (US); Gopala Krishna R. Kakivaya, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/924,867

(22) Filed: Jun. 24, 2013

(65) Prior Publication Data

US 2013/0290398 A1    Oct. 31, 2013

Related U.S. Application Data

(63) Continuation of application No. 12/964,581, filed on Dec. 9, 2010, now Pat. No. 8,724,645, which is a continuation-in-part of application No. 12/892,345, filed on Sep. 28, 2010, now Pat. No. 8,516,032.

(51) Int. Cl.
    *H04L 12/28* (2006.01)
    *H04L 29/08* (2006.01)
    (Continued)

(52) U.S. Cl.
    CPC .......... *H04L 29/08135* (2013.01); *G06F 9/466* (2013.01); *G06F 11/1474* (2013.01); *G06F 11/2041* (2013.01); *G06F 11/2097* (2013.01); *G06F 11/1438* (2013.01)

(58) Field of Classification Search
    USPC .................. 370/412, 252, 278, 419
    See application file for complete search history.

(56) References Cited

U.S. PATENT DOCUMENTS 7,069,298 B2   6/2006 Zhu
7,152,157 B2   12/2006 Murphy
(Continued)

FOREIGN PATENT DOCUMENTS

CN         1577314       2/2005
CN         1659539       8/2005
WO    WO 2008040067      10/2008

OTHER PUBLICATIONS

Notice of Allowance dated Jan. 8, 2014 cited in U.S. Appl. No. 12/964,581.

(Continued)

*Primary Examiner* — John Pezzlo
(74) *Attorney, Agent, or Firm* — Henry Gabryjelski; Raghu Chinagudabha; Micky Minhas

(57) ABSTRACT

The present invention extends to methods, systems, and computer program products for performing computations in a distributed infrastructure. Embodiments of the invention include a general purpose distributed computation infrastructure that can be used to perform efficient (in-memory), scalable, failure-resilient, atomic, flow-controlled, long-running state-less and state-full distributed computations. Guarantees provided by a distributed computation infrastructure can build upon existent guarantees of an underlying distributed fabric in order to hide the complexities of fault-tolerance, enable large scale highly available processing, allow for efficient resource utilization, and facilitate generic development of stateful and stateless computations. A distributed computation infrastructure can also provide a substrate on which existent distributed computation models can be enhanced to become failure-resilient.

20 Claims, 17 Drawing Sheets

(51) Int. Cl.
*G06F 9/46* (2006.01)
*G06F 11/20* (2006.01)
*H04J 1/16* (2006.01)
*G06F 11/14* (2006.01)

(56) References Cited

U.S. PATENT DOCUMENTS

| | | | |
|---|---|---|---|
| 7,586,909 | B1 | 9/2009 | Walrand et al. |
| 7,624,109 | B2 | 11/2009 | Testardi |
| 7,747,717 | B2 | 6/2010 | Colrain |
| 7,783,763 | B2 | 8/2010 | Tuel |
| 8,281,184 | B1 | 10/2012 | Havemose |
| 2002/0073153 | A1 | 6/2002 | Miller |
| 2003/0172195 | A1 | 9/2003 | Jonkers |
| 2004/0030731 | A1 | 2/2004 | Iftode et al. |
| 2006/0294333 | A1 | 12/2006 | Michaylov et al. |
| 2007/0180451 | A1 | 8/2007 | Ryan |
| 2008/0126505 | A1 | 5/2008 | Holt |
| 2008/0235369 | A1 | 9/2008 | Wouhaybi |
| 2008/0270838 | A1 | 10/2008 | Dorai |
| 2009/0031115 | A1 | 1/2009 | Pruiett |
| 2009/0109881 | A1* | 4/2009 | Li et al. ............ 370/280 |
| 2009/0112784 | A1 | 4/2009 | Brun et al. |
| 2009/0217274 | A1 | 8/2009 | Corbin et al. |
| 2009/0249310 | A1 | 10/2009 | Meijer |
| 2009/0254894 | A1 | 10/2009 | Chen |
| 2010/0107002 | A1 | 4/2010 | Kakivaya |
| 2012/0079234 | A1 | 3/2012 | Tarta |
| 2012/0079505 | A1 | 3/2012 | Tarta |
| 2013/0151793 | A1* | 6/2013 | Rudosky et al. .............. 711/147 |

OTHER PUBLICATIONS

White Paper, High-Availability, "The Future of High-Availability", May 20, 2005, 7 pages.

Resnick, Ron I., "A Modern Taxonomy of High Availability", 1996, Accessed Jul. 1, 2010, 25 pages.

Datta, Anwitaman, "MobiGrid: Peer-to-Peer Overlay and Mobile Ad-Hoc Network Rendezous—a Data Management Perspective", Based on information and belief available, at least as early as Jul. 1, 2010, 12 pages.

Hadoop and Distributed Computing at Yahoo, "Distributed computing Archive: May 2009", May 13, 2009, 4 pages.

Choi, Ben, et al., "Distributed Object Space Cluster Architecture for Search Engines", 2003, 6 pages. (The month of Publication is irrelevant since the year of Publication is clearly prior to the filing of the Application).

On, Giwon, et al., "Quality of Availability: Replica Placement for Widely Distributed Systems", 2003, 18 pages. (The month of Publication is irrelevant since the year of Publication is clearly prior to the filing of the Application).

Notice of Allowance dated Mar. 25, 2013 cited in U.S. Appl. No. 12/964,581.

Notice of Allowance dated May 10, 2013 cited in U.S. Appl. No. 12/892,345.

* cited by examiner

PERFORMING COMPUTATIONS IN A DISTRIBUTED INFRASTRUCTURE

CROSS-REFERENCE TO RELATED APPLICATIONS

This application is a continuation of U.S. patent application Ser. No. 12/964,581, entitled "PERFORMING COMPUTATIONS IN A DISTRIBUTED INFRASTRUCTURE", which was filed on Dec. 9, 2010 and which issued on May 13, 2014 as U.S. Pat. No. 8,724,645, which application is a continuation-in-part of U.S. patent application Ser. No. 12/892,345, entitled "PERFORMING COMPUTATIONS IN A DISTRIBUTED INFRASTRUCTURE, which was filed on Sep. 28, 2010 and which issued on Aug. 20, 2013 as U.S. Pat. No. 8,516,032. The contents of each of the foregoing applications are incorporated by reference in their entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, clients route requests for a service to a logical destination referred to as the service rendezvous point. More specifically, these routed service requests are processed by federation nodes serving as the rendezvous point owners. A typical service that can be provided at the rendezvous point is storage, such as, for example, SQL Server Data Services.

One complexity of this system compared to the traditional client-server model is that the rendezvous point ownership can change as nodes join and leave a federation, or faults occur in the system. However, it is desirable to shield clients from this complexity and provide them the illusion that they are getting service from a single, logically consistent, rendezvous point.

As such, to provide a single, logically consistent service at a rendezvous point, state maintained at the rendezvous point must be replicated to ensure that it is not lost when a node currently serving as the rendezvous point owner faults. This replication enables any node replacing the faulted node as owner to behave in manner consistent with the actions taken by the faulted node prior to its failure. That is, one can view this as the replicated state machine problem, which in turn implies data consistency guarantees.

However, existing distributed system typically lack any solution to the problem of providing distributed computations as replicated highly available services. Most existing distributed computation models have a different focus. For example, intermediate results (inputs and outputs) have to use files or specialized stores in order to achieve some high availability guarantees. Further, these distributed computations models are data flow oriented, where operators receive inputs, produce outputs and they are mostly functional and stateless. These operators also cannot start unless all of their inputs are available.

Another limitation of typical distributed computation models is failure to provide strong consistency guarantees for computations that execute in the presence of failures or load balancing, leaving all that work up to the developer/operator of the computation (restart, termination, failover etc.).

BRIEF SUMMARY

The present invention extends to methods, systems, and computer program products for performing computations in a distributed infrastructure. Embodiments of the invention include linking individual compute instances together to represent a distributed computation. Individual compute instances can implement stateful or stateless computations locally. Individual compute instances can also include input queues and output queues for transferring messages between one another in accordance with a queue to queue protocol. Thus, output from one compute instance can serve as the input to another compute instance.

Message acknowledgments can be used to mitigate the possibility of input loss when one or more stateless computations are situated between stateful computations. Unique message identifiers and acknowledgment acknowledgments can be further used to mitigate the possibility of input duplication when one or more stateless computations are situated between stateful computations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
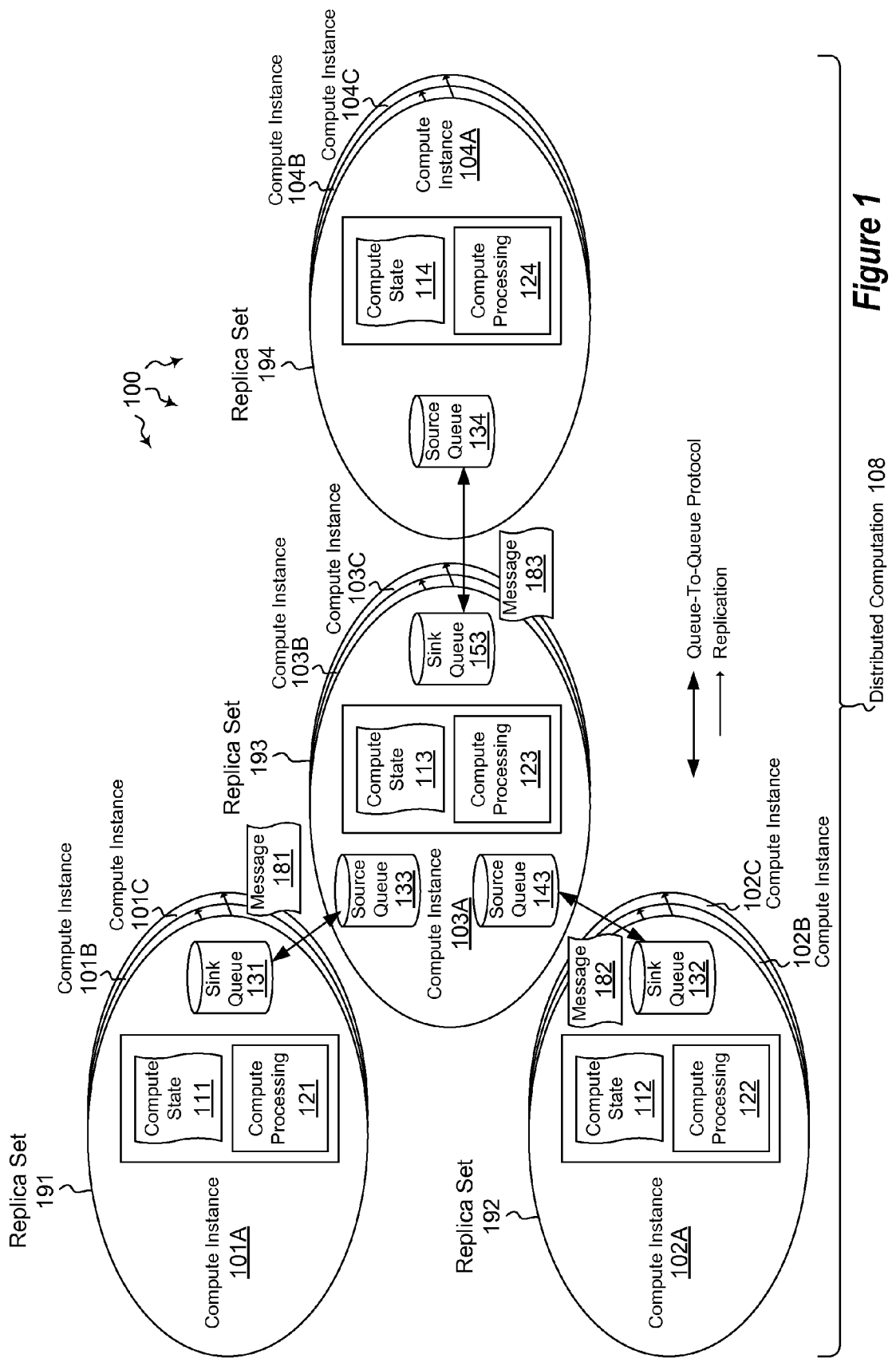
FIG. 1 illustrates an example distributed computation architecture that facilitates performing distributed computation.

The present invention extends to methods, systems, and computer program products for performing computations in a distributed infrastructure. Embodiments of the invention include linking individual compute instances together to represent a distributed computation. Individual compute instances can implement stateful or stateless computations locally. Individual compute instances can also include input queues and output queues for transferring messages between one another in accordance with a queue to queue protocol. Thus, output from one compute instance can serve as the input to another compute instance.

Message acknowledgments can be used to mitigate the possibility of input loss when one or more stateless computations are situated between stateful computations. Unique message identifiers and acknowledgment acknowledgments can be further used to mitigate the possibility of input duplication when one or more stateless computations are situated between stateful computations.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media.

Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include a general purpose distributed computation infrastructure that can be used to perform efficient (in-memory), scalable, failure-resilient, atomic, flow-controlled, long-running state-less and state-full distributed computations. Guarantees provided by a distributed computation infrastructure can build upon existent guarantees of an underlying distributed fabric, such as, for example, an overlay network, in order to hide the complexities of fault-tolerance, enable large scale highly available processing, allow for efficient resource utilization, and facilitate generic development of stateful and stateless computations. Guarantees can include neighborhood and routing consistency, perfect failure detection, and data consistent replication and failover reconfigurations. A distributed computation infrastructure can also provide a substrate on which existent distributed computation models can be enhanced to become failure-resilient.

In some embodiments, service state/data/configuration is replicated to provide high availability for distributed servers. Compute nodes (entities involved in replication relationships) form a replica set or partition. Within a replica set or partition, one compute node can be a primary compute node and one or more other compute nodes can be secondary compute nodes. Read operations can be completed by the primary compute node. Write operations can be seen first by the primary compute node and then forwarded to secondary compute nodes using a quorum commit protocol. Each secondary compute node in a replica set can see and apply changes in the same order as the primary compute node saw and applied them.

A set of failover and reconfiguration algorithms can be employed to provide clients with the illusion of receiving service from a single consistent entity. The algorithms can provide guarantees around maintaining replica sets (partitions) in a functioning state. Maintaining a functioning state can include failover from a primary compute node to a secondary compute node, building a new secondary compute node when too few secondary compute nodes are available, and switching a primary compute node with an existing secondary compute node.

In order to provide consistency guarantees in a distributed computation infrastructure, failure detectors can be used. A failure detector has responsibility for providing reliable information about which entities within distributed computation architecture (e.g., processes) are down. Different types of failure detectors can be used. In some embodiments, a perfect failure detector, which is strongly accurate (no process that is up is reported to be down) and strongly complete (all processes that are down are reported) is used.

Embodiments of the invention also include a messaging sub-system. The messaging sub-system can utilize messaging primitives to accomplish sending a message to a node/process or to a replica set within a distributed computation architecture. Utilized messaging paradigms can include point-to-point, multicast, and broadcast, with one or more of best-effort and reliable versions.

A local computation is defined as being a replica set (partition). Inputs of a local computation can modeled as a set of First In, First Out ("FIFO") queues (sources). Outputs of a local computation can modeled as a set of FIFO queues (sinks) Each instance of a local computation is a class implementing an interface for exposing its state (if any) and for performing the actual processing. For state-full computations, the state and/or state changes can be made highly available through a fabric (e.g., overlay network) replication layer. Local computations that consume inputs and produce outputs can be made highly available in the same manner.

As such, a distributed computation can be represented by a Directed Acyclic Graph ("DAG") of local computations. Outputs from upstream local computations are delivered as input to downstream local computations.

FIG. 1 illustrates an example distributed computation architecture 100 that facilitates performing distributed computation 108. Referring to FIG. 1, distributed computation architecture 100 includes replica sets 191, 192, 193, and 194. Each of the depicted replicas (which may include one or more computer systems) is connected to one another over (or is part of) a network, such as, for example, a Local Area Network ("LAN"), a Wide Area Network ("WAN"), and even the Internet. Accordingly, each of the depicted replicas as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Distributed computation 108 is represented by a DAG formed from replica sets (local computations) 191, 192, 193, and 194. As depicted, each replica set (local computation) includes a plurality of compute instances. For example, replica set 191 includes compute instances 101A, 101B, and 101C. Compute instance 101A includes compute state 111, compute processing 121, and sink queue 131. Similarly, replica set 192 includes compute instances 102A, 102B, and 102C. Compute instance 102A includes compute state 112, compute processing 122, and sink queue 132.

Likewise, replica set 193 includes compute instances 103A, 103B, and 103C. Compute instance 103A includes compute state 113, compute processing 123, source queues 133 and 143 and sink queue 153. In turn, replica set 194 includes compute instances 104A, 104B, and 104C. Compute instance 104 includes compute state 114, compute processing 124, and source queue 134.

Generally, compute processing 121 and compute processing 122 perform one or more operations to alter compute state 111 and 112 and output messages 181 and 182 respectively. Compute instance 101A can queue message 181 in sink queue 131. Compute instance 101B can queue message 182 in sink queue 132.

Changes to compute state 111 and the enqueueing of message 181 in sink queue 131 can be replicated to compute instances 101B and 101C. Similarly, changes to compute state 112 and the enqueueing of message 182 in sink queue 132 can be replicated to compute instances 102B and 102C.

A queue-to-queue protocol can be used to dequeue messages 181 and 182 from sink queues 131 and 132 respectively and enqueue messages 181 and 182 in source queues 133 and 143 respectively. Dequeueing of message 181 from sink queue 131 can be replicated to compute instances 101B and 101C. Similarly, dequeueing of message 182 from sink queue 132 can be replicated to compute instances 102B and 102C. Likewise, enqueueing of messages 181 and 182 in source queues 133 and 143 can be replicated to compute instances 103B and 103C.

Compute processing 123 can use messages 181 and 182 to perform one or more operations to alter compute state 113 and output message 183. Compute instance 103A can queue message 183 in sink queue 153. Changes to compute state 113 and the enqueueing of message 183 in sink queue 153 can be replicated to compute instances 103B and 103C.

The queue-to-queue protocol can be used to dequeue message 183 from sink queue 153 and enqueue messages 183 in source queue 134. Dequeueing of message 183 from sink queue 153 can be replicated to compute instances 103B and 103C. Likewise, enqueueing of messages 183 in source queue 134 can be replicated to compute instances 104B and 104C.

Compute processing 124 can use message 183 to perform one or more operations to alter compute state 114. Changes to compute state 113 can be replicated to compute instances 104B and 104C.

Figure 2A:
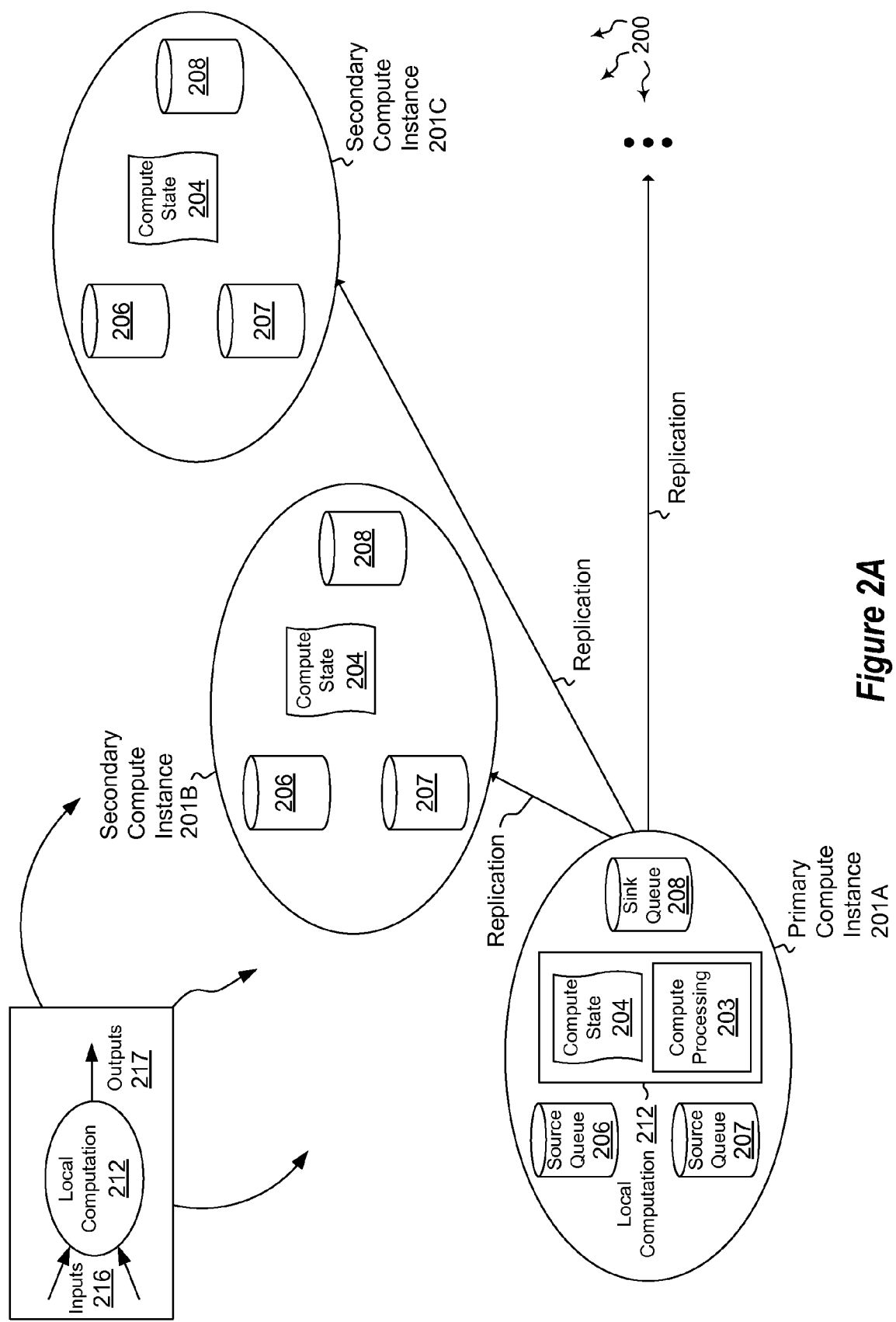
FIG. 2A illustrates an additional view of a replica set for a local stateful computation.

FIG. 2A illustrates an additional view of a replica set 200 for a local stateful computation 212, such as, for example, an edit computation, a sort computation, etc. Generally, local computation 212 receives inputs 216 and generates outputs 217.

As depicted, primary compute instance 201A includes source queues 206 and 207, local computation 212, and sink queue 208. Local computation 212 further includes computer state 204 and compute processing 203. As compute processing 203 executes, source queues 206 and 207 (e.g., dequeueing messages), compute state 204 (e.g., changing values), and output queue 208 (e.g., enqueueing messages) can be changed. These changes are replicated to corresponding source queues 206 and 207, compute state 204, and output queue 208 at secondary compute instances 201B and 201C. Thus, in the event primary compute instance 201A fails, one of secondary compute instances 201B, 201C, etc can assume the role as the primary compute node. Upon assuming the role as primary computer node, the assuming node can take over compute processing 203.

Operations that are part of location computation include consumption of input data, production of output data, and modifications to its internal state, is associated with a transaction. The transaction concept provides atomicity guarantees across a set of operations are part of a local computation. A local computation can incrementally create a set of transactions, sequential or concurrent, in which it records information that needs to be made highly available. Transaction creation can include dequeue operations from the source queues, enqueue operations into the sink queues, and internal state changes. When a transaction completes, all changes created by the operations are committed (or aborted) as an atomic unit. Thus transactions help ensure the processing continues from the same consistent view in the event of a failure. A fail-fast approach can be being taken when a transaction fails to commit (or abort for that matter).

Source queues provide a dequeue operation and sink queues provide an enqueue operation. Transactions provide the ability to commit or abort the current changes made by a local computation. Each local computation implements a state get/set interface used in case a new replica set has to be built for the local computation. Also, each local computation implements an interface that allows for initial processing parameters to be passed in as part of the computation initialization (initial state, configuration options etc.).

As such, during a local computation, messages are dequeued/consumed from source queues and are processed in an active transaction (e.g., with a given id). As part of the transaction, new state can be created and new output messages produced.

When a transaction commits, the messages dequeued from the source queues are physically removed. The new output message produced is also enqueued into the sink queue. The new committed state is a committed reconciliation between the old committed state and the uncommitted state change that was produced while processing. For computations is designed in this manner, when failovers occur in the system, the state of the computation and its inputs and outputs are consistent with each other. This results in a simpler experience for the development of new types of highly available local computations.

Operations performed as part of a local computation can take effect at commit time. That is, when atomically all changes that occurred in processing take place. Logical cursors can be maintained on the source queues and the sink queues may not be touched effectively until commit.

Transaction operations can be replicated in different modes. In some embodiments, an eager replication mode is used. Using eager replication transaction operations are replicated as they occur and each compute instance in a replica set buffers operations. In other embodiments, a lazy replication mode is used. Using a lazy replication mode transaction operations on a primary compute instance are seem on second compute instances at a later time. Lazy replication mode can be used when the transaction operation cost is smaller than the cost of replicating it. Thus, amortizing the cost by batching replication of transaction operations is beneficial. In one specific implementation of lazy mode replication transaction operations are replicated only at commit time.

When a transaction aborts, the transaction can restore elements from the source queues and make them available for subsequent dequeue operations. New state changes can be forgotten and do not necessarily need to be undone. Since it is unlikely sink queues have been touched, outputs can be discarded.

On a failover, in-flight transactions that exist currently on the new primary (old secondary) can be discarded (as they had no work to do). If a failover does not involve the crash of a primary (e.g., a failover is caused by a load balancing swap role action), transactions in progress on the old primary (new secondary) receive aborting exceptions and processing on the old primary stops.

Concurrent execution of transactions within a single computation can occur.

Figure 2B:
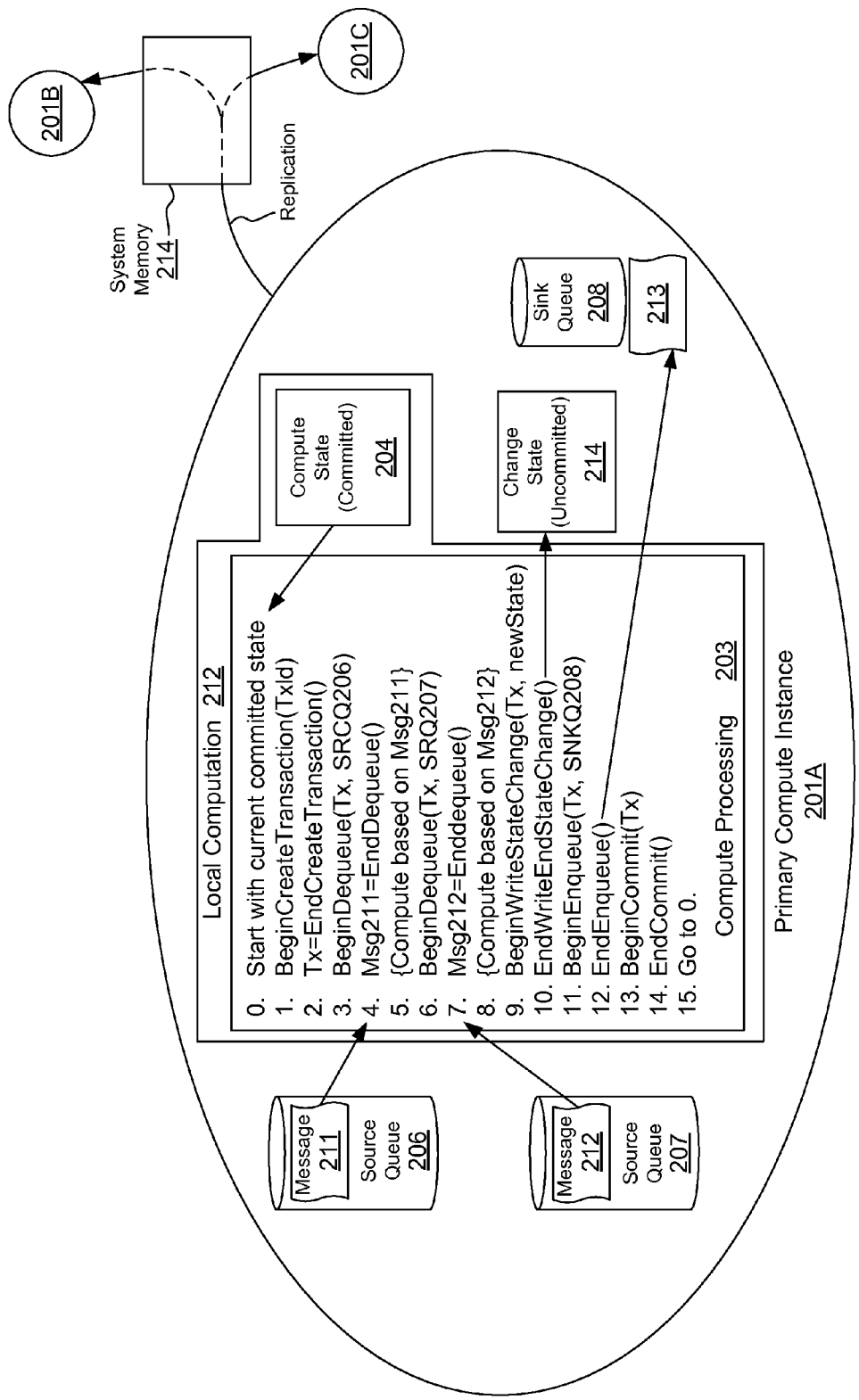
FIG. 2B illustrates a further view of the primary compute instance for the local stateful computation depicted in FIG. 2A

FIG. 2B illustrates a further view of the primary compute instance 201A for the local stateful computation 212. As depicted, compute processing 203 can include a number of operations that are executed to implement local stateful computation 212. Included in the operations are operations for dequeueing messages from source queues (e.g., lines 3 and 4 and 6 and 7) and enqueueing messages in sink queues (e.g., lines 11 and 12). Included in the operations are also operations for performing computations based message content (e.g., lines 5 and 8). Include in the operations are also operations for enqueueing a message (e.g., lines 11 and 12). Included in the operation are also operations for implementing state changes (e.g., lines 9 and 10). These operations can be closed within other operations indicating the beginning and end of a transaction (e.g., lines 1 and 2 and 13 and 14).

The performance of operations at primary compute instance 201A can be replicated into system memory 214 to secondary compute nodes 201B, 201C, etc. Replication can occur on a per operation basis or on a batch of operations basis.

Figure 6:
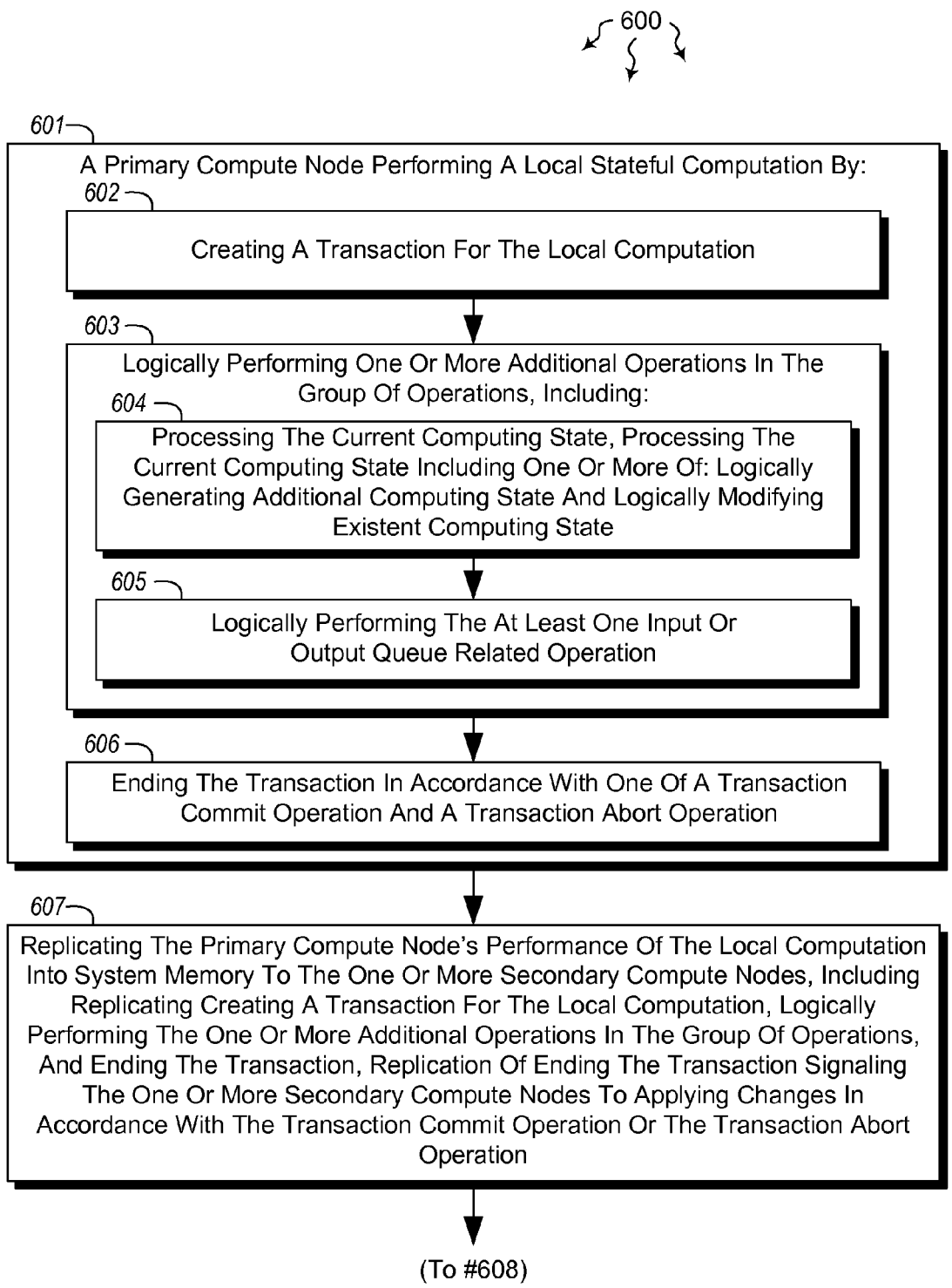
FIG. 6 illustrates a flow chart of an example method for performing the stateful local computation at a replica set.
Figure 6:
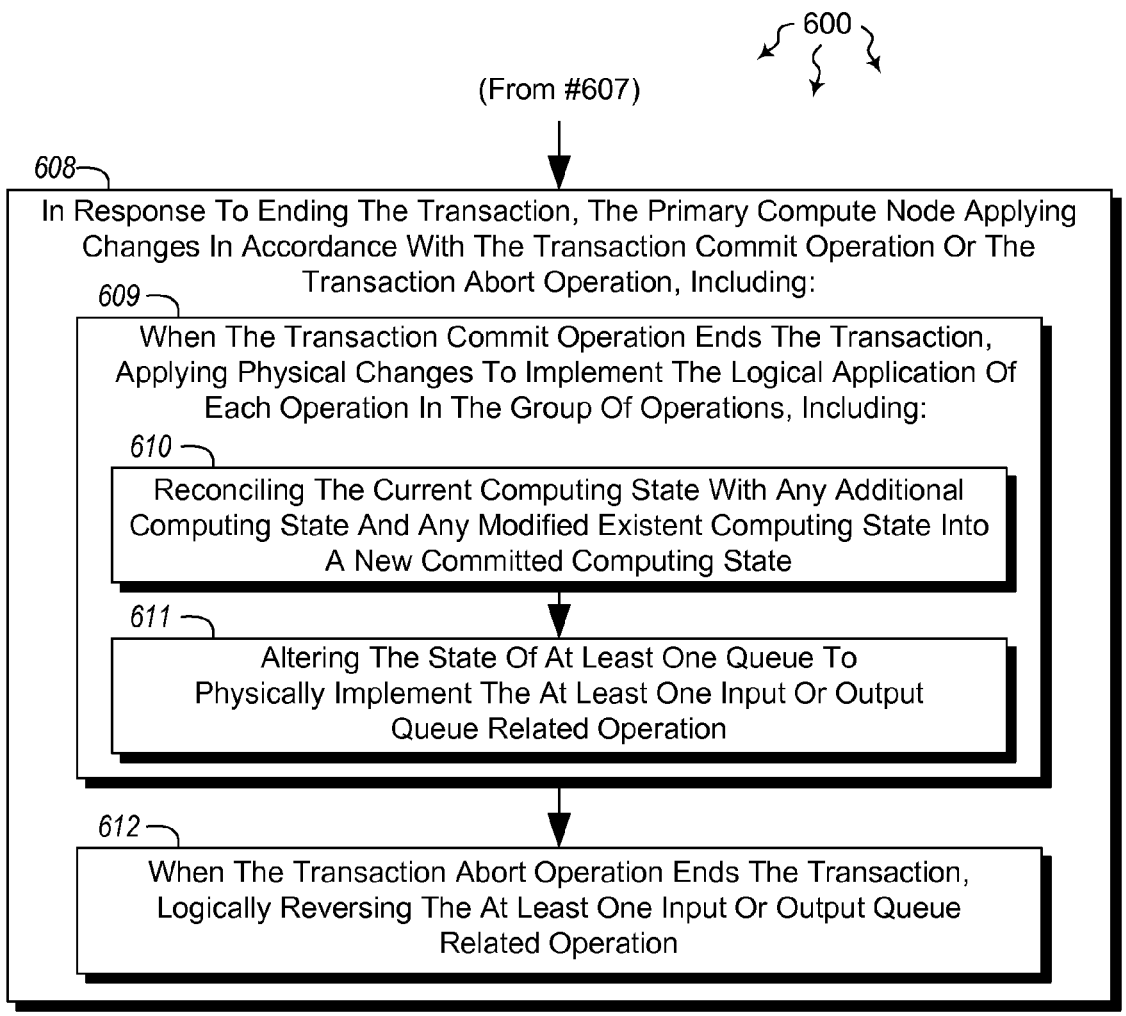

FIG. 6 illustrates a flow chart of an example method 600 for performing the stateful local computation at a replica set. Method 600 will be described with respect to the components and data of FIG. 2B.

Method 600 includes an act of a primary compute node performing a local computation (act 601). For example, primary compute instance 201A can perform local computation 212. Performing the local computation includes an act of the creating a transaction for the local computation (act 602). For example, lines 1 and 2 of compute processing 203 can be executed to create a transaction for location computation 212.

Performing the local computation includes an act of logically performing one or more additional operations in the group of operations (act 603). For example, lines 3-12 of compute processing 203 can be executed to logically perform one or more additional operations of local computation 212.

Logically performing one or more additional operations includes an act of processing the current computing state, processing the current computing state including one or more of: logically generating additional computing state and logically modifying existent computing state (act 604). For example, lines 5 and 8 can be executes to process compute state 204 along with content from corresponding messages 211 and 212 respectively. Processing compute state 204 can logically generate new state or modify compute state 204. Line 10 can be executed to write out new and/or changed state 214.

Logically performing one or more additional operations includes an act of logically performing the at least one input or output queue related operation (act 605). For example, lines 3 and 4 or lines 6 and 7 can be executed to perform input queue operations related to source queues 206 and 207 respectively. Lines 11 and 12 can be executed to perform output queue operations related to sink queue 208.

Performing the local computation includes an act of ending the transaction in accordance with one of a transaction commit operation and a transaction abort operation (act 606). For example, lines 13 and 14 of compute processing 203 can be executed to commit the transaction created at lines 1 and 2. Alternately, lines of instructions for aborting the transaction created at lines 1 and 2 can be executed.

Method 600 includes an act of replicating the primary compute node's performance of the local computation into system memory to the one or more secondary compute nodes, including replicating creating a transaction for the local computation, logically performing the one or more additional operations in the group of operations, and ending the transaction, replication of ending the transaction signaling the one or more secondary compute nodes to applying changes in accordance with the transaction commit operation or the transaction abort operation (act 607). For example, primary compute instance 201A's performance of local computation 212 can be replicated into system memory 214 to secondary compute instances 201B, 201C, etc. Replication of the performance of local computation 212 can include replicating creating the transaction at lines 1 and 2, performing one or more additional operations at lines 3-12, and committing the transaction at lines 13 and 14. Alternately, when the transaction is aborted, replication can include replicating aborting the transaction. Replication can occur on a per operation basis (e.g., a line at a time) or on a batch of operations basis (e.g., grouped operations).

Replication of ending (either committing or aborting) the transaction signals the secondary compute instances 201B, 201C, etc, to applying changes in accordance with the transaction commit operation or the transaction abort operation as appropriate.

Method 600 includes in response to ending the transaction, an act of the primary compute node applying changes in accordance with the transaction commit operation or the transaction abort operation (act 608). For example, primary compute instance 201A can apply changes in accordance with the transaction commit operation (at lines 13 and 14). Alternately, primary compute instance 201A can apply changes in accordance with a transaction abort operation.

Method 600 includes when the transaction commit operation ends the transaction, an act of applying physical changes to implement the logical application of each operation in the group of operations (act 609). For example, when a transaction commit ends the transaction, primary compute instance 201A can apply physical changes to implement logical application of lines 3-12 of compute processing 203.

Applying physical changes includes an act of reconciling the current computing state with any additional computing state and any modified existent computing state into a new committed computing state (act 610). For example, primary compute instance 201A can reconcile compute state 204 with changed state 214 (which can include changed and/or new state) into new committed state 204.

Applying physical changes includes method 600 includes an act of altering the state of at least one queue to physically implement the at least one input or output queue related operation (act 611). For example, primary compute instance 201A can physically dequeue messages 211 and 212 from source queues 206 and 207 respectively and physically enqueue message 213 into sink queue 208.

Method 600 includes when the transaction abort operation ends the transaction, an act of logically reversing the at least one input or output queue related operation (act 612). For example, when a transaction abort ends the transaction, primary compute instance 201A can logically reverse the execution of lines 3-12 of compute processing 203. This can include reversing logical enqueue and dequeue message operations.

Figure 3:
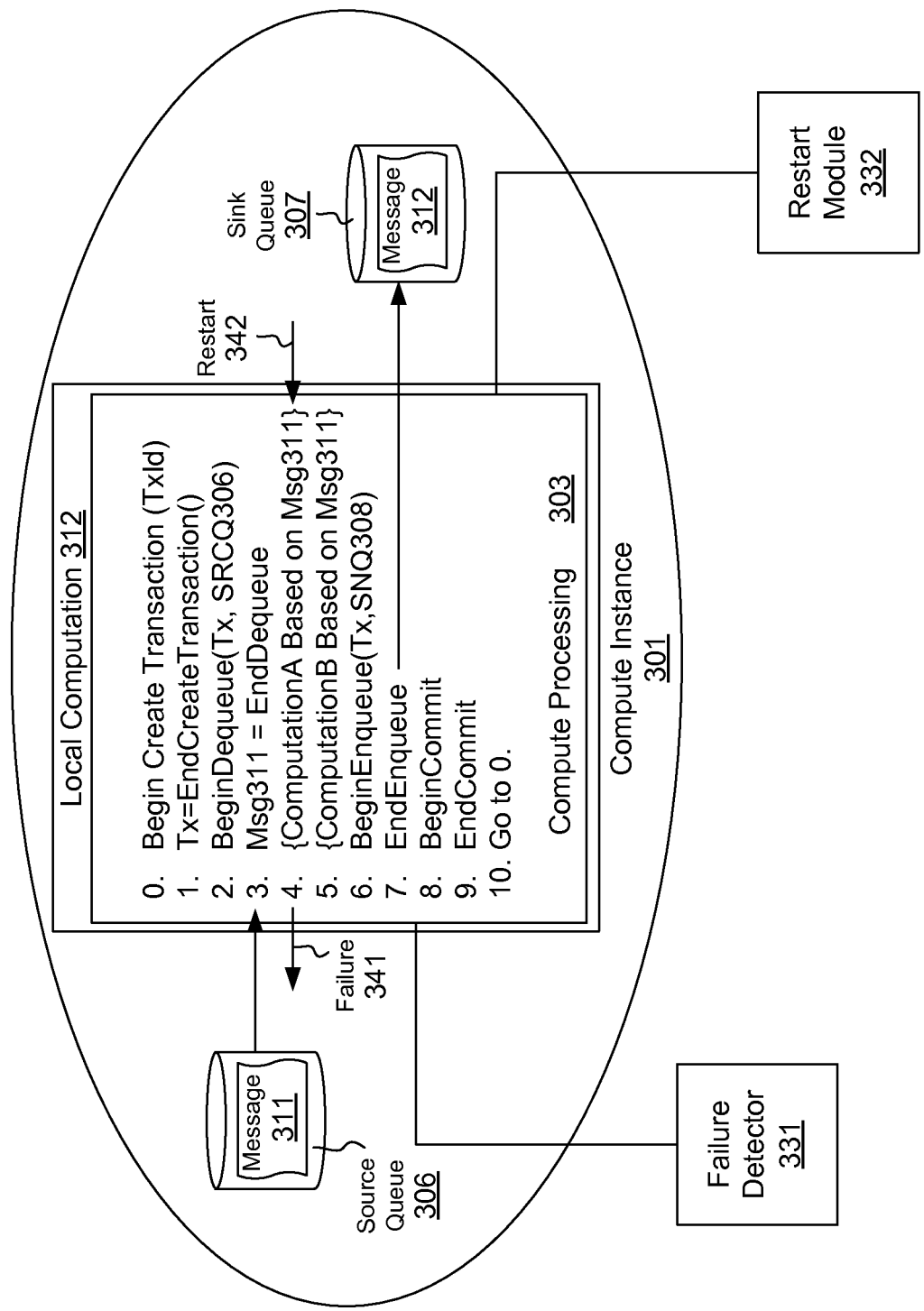
FIG. 3 illustrates a view of a compute instance for a local stateless computation.

FIG. 3 illustrates a view of a compute instance 301 for a local stateless computation 312, such as, for example, a read computation, a filtering computation, etc. As depicted in FIG. 3 includes compute instance 301, failure detector 331, and restart module 332. Compute instance 301 includes source queue 306 local computation 312, and sink queue 307. As compute processing 303 executes, source queue 306 (e.g., dequeueing messages) and output queue 208 (e.g., enqueueing messages) can be changed. Failure detector 331 is configured to detect when and where an operation in compute processing 303 fails. Restart module 332 is configured to restart compute processing 303 from a point of failure.

Figure 7:
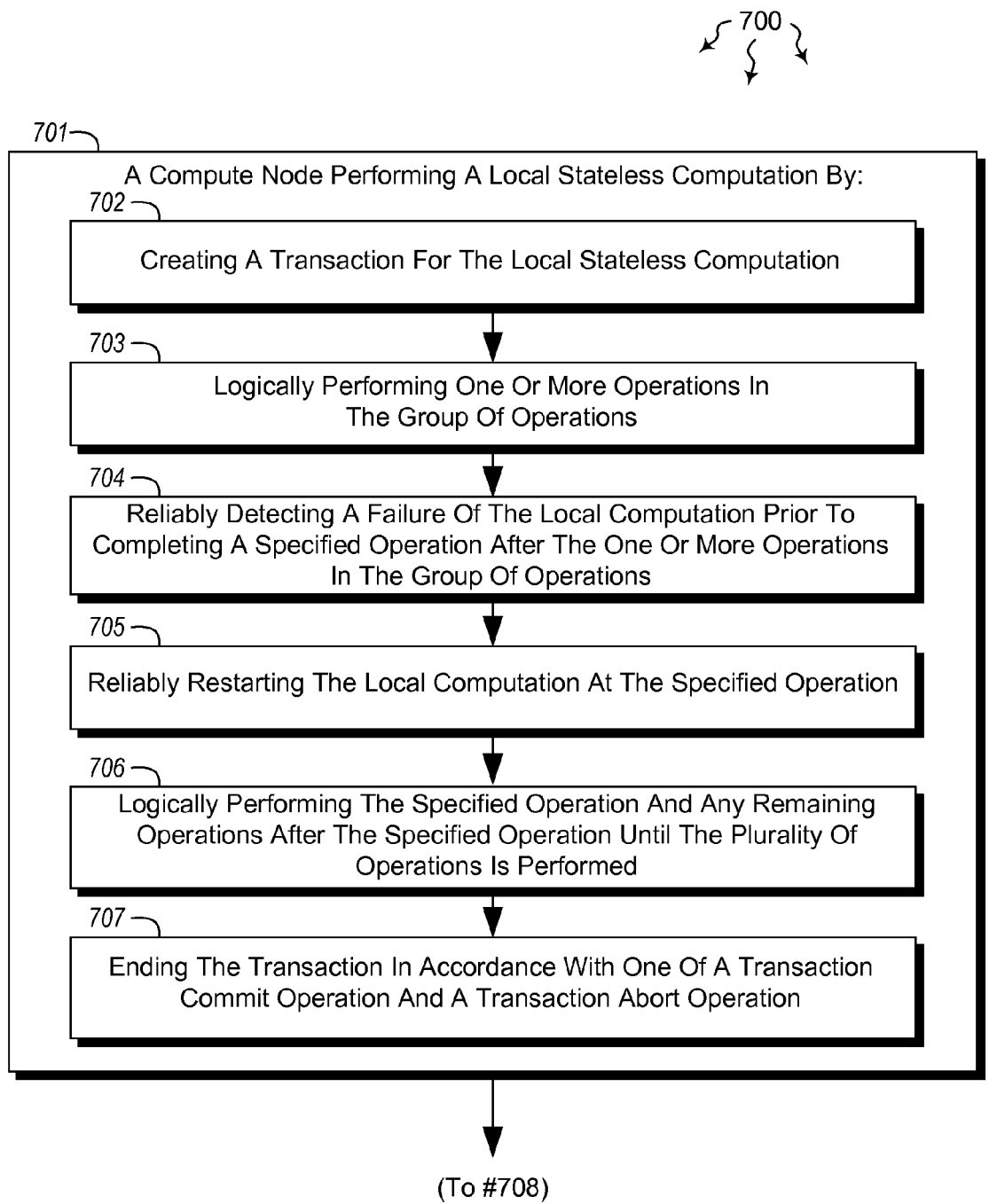
FIG. 7 illustrates a flow chart of an example method for performing a stateless local computation.
Figure 7:
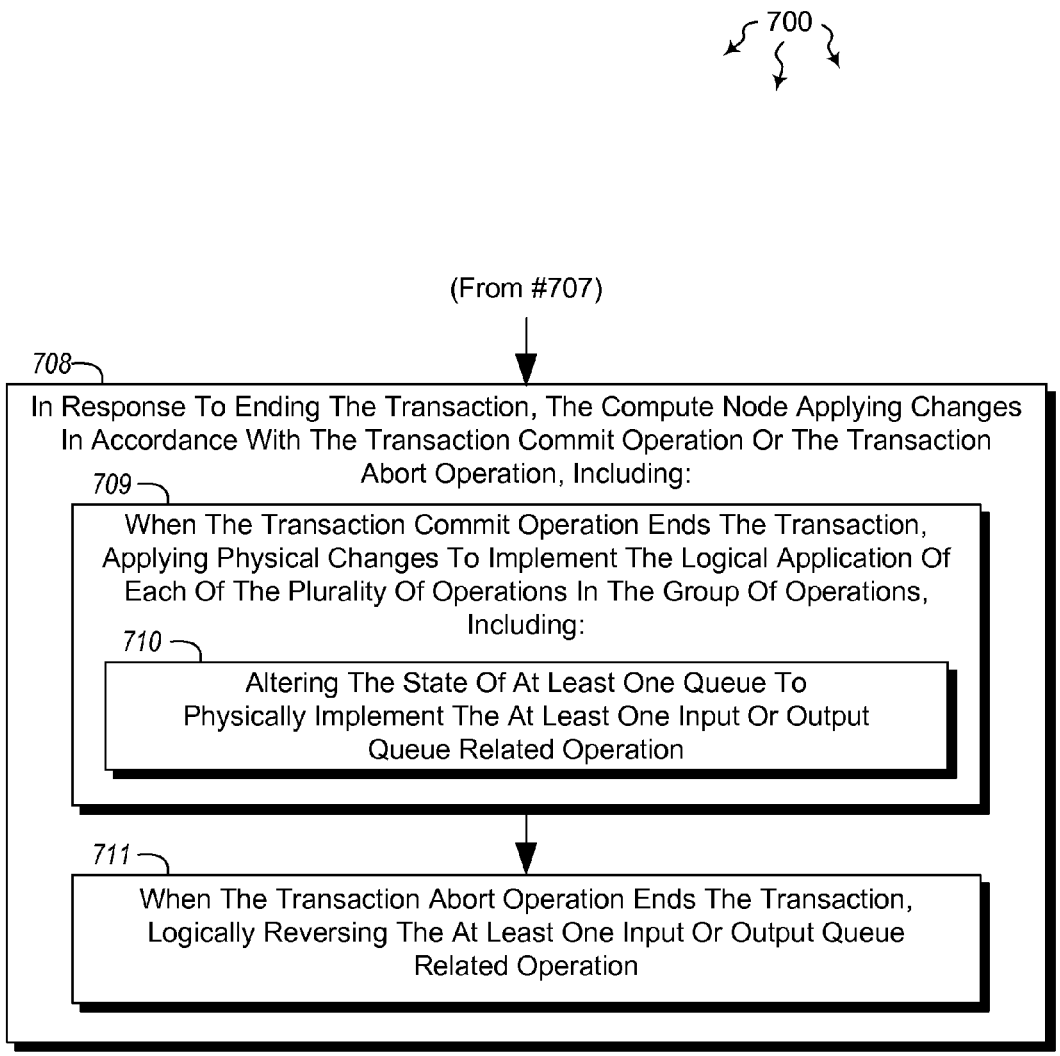

FIG. 7 illustrates a flow chart of an example method 700 for performing a stateless local computation. Method 700 will be described with respect to the components and data of FIG. 3.

Method 700 includes an act of the compute node performing a local stateless computation (act 701). For example, compute instance 201 can perform local computation 312. Method 700 includes an act of the creating a transaction for the local stateless computation (act 702). For example, lines 0 and 1 of compute processing 303 can be executed to create a transaction for location computation 312. Method 700 includes an act of logically performing one or more operations in the group of operations (act 703). For example, compute instance 301 can logically perform lines 2 and 3 of compute processing 303.

Method 700 includes an act of reliably detecting a failure of the local computation prior to completing a specified operation after the one or more operations in the group of operations (act 704). For example, failure detector 331 can detect a failure 341 prior to completing line 4 of compute processing 303. Method 700 includes an act of reliably restarting the local computation at the specified operation (act 705). For example, restart module 332 can issue restart 342 to restart local computation 312 at line 4 of compute processing 303.

Method 700 includes an act of logically performing the specified operation and any remaining operations after the specified operation until the plurality of operations is performed (act 706). For example, compute instance 301 can logically perform line 4 and then lines 5-9 of compute processing 303. Method 700 includes an act of ending the transaction in accordance with one of a transaction commit operation and a transaction abort operation (act 707). For example, lines 8 and 9 of compute processing 3030 can be executed to commit the transaction created at lines 0 and 1. Alternately, lines of instructions for aborting the transaction created at lines 0 and 1 can be executed.

Method 700 includes in response to ending the transaction, an act of the primary compute node applying changes in accordance with the transaction commit operation or the transaction abort operation (act 708). For example, compute instance 301 can apply changes in accordance with the transaction commit operation (at lines 8 and 9). Alternately, compute instance 301 can apply changes in accordance with a transaction abort operation.

Method 700 includes when the transaction commit operation ends the transaction, an act of applying physical changes to implement the logical application of each of the plurality of operations in the group of operations (act 709). For example, when a transaction commit ends the transaction, compute instance 301 can apply physical changes to implement logical application of lines 2-7 of compute processing 303.

Method 700 includes an act of altering the state of at least one queue to physically implement the at least one input or output queue related operation (act 710). For example, compute instance 301 can physically dequeue messages 211 and from source queues 206 and physically enqueue message 312 into sink queue 307.

Method 700 includes when the transaction abort operation ends the transaction, an act of logically reversing the at least one input or output queue related operation (act 711). For example, when a transaction abort ends the transaction, compute instance 301 can logically reverse the execution of lines 2-8 of compute processing 303. This can include reversing logical enqueue and dequeue message operations.

Figure 4A:
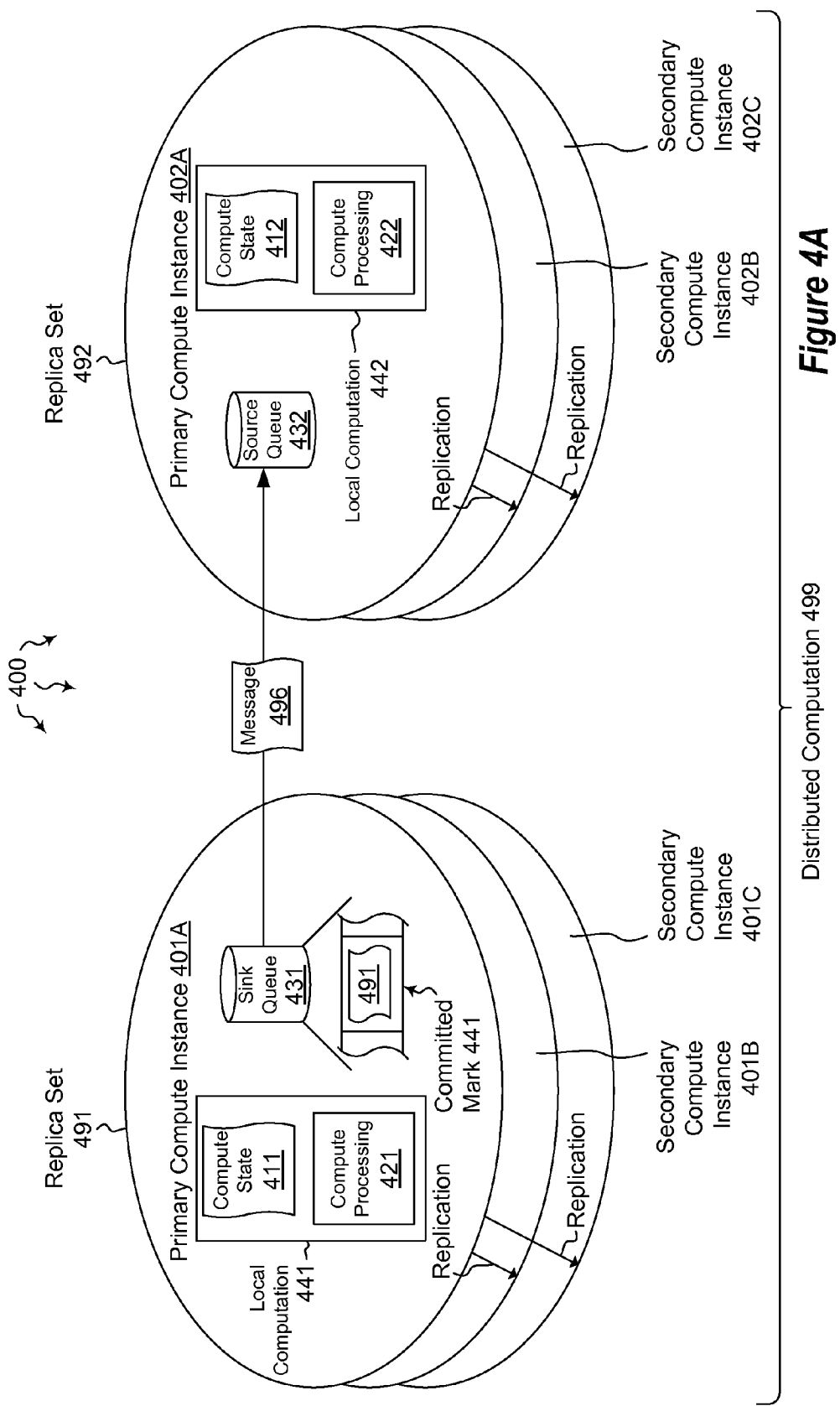
FIG. 4A illustrates an example distributed computation architecture that facilitates performing a distributed computation.

FIG. 4A illustrates distributed computation architecture 400 that facilitates performing a distributed computation 499. As depicted, distributed computation architecture includes replica sets 491 and 492. Replica set 491 includes primary compute instance 401A and secondary compute instances 401B and 401C. Likewise, replica set 492 includes primary compute instance 402A and secondary compute instances 402B and 402C.

Generally, messages (e.g., message 496) can be transferred from replica set 491 to replica set 492 in accordance with a queue to queue protocol. The queue to queue protocol can be responsible for implementing a state machine for the exactly once in order transfer of messages from a sink queue to one or more downstream source queues. The queue protocol can limit message transfers to committed messages in the sink queues. Limiting to committed messages can be accomplished by keeping state in each sink queue of a committed mark that gets updated with each commit. The queue to queue protocol can also implement flow-control policies applied at either or all endpoints in order to prevent over/under utilization in the system.

The queue to queue protocol can rely on existent fabric (e.g., overlay network) components such as, for example, consistent routing and (e.g., perfect) failure detection. Failure detection can be used to determine a new primary compute instance of a downstream computation in the case of a failover, and a routing layer can be used to implement reliable message delivery. A receiver compute node's protocol endpoint can implement duplicate detection, message re-ordering, and throttling based on queue quotas. A sender computer node's endpoint can implement a sending window algorithm with retries and exponential back-off.

Using a windowing mechanism, the queue to queue protocol can achieve flow control in a DAG representing a distributed computation. Temporary performance bottlenecks in a local computation of a downstream partition translates into queue-to-queue protocol exerting back pressure on the sink queue feeding into source queue of the affected local computation. The back pressure in turn affects timely completion of the enqueue operations of the local computations of the upstream partition feeding into the affected sink queue. The reduction in timely completion further in turn translates to the sources queues of the local computation of the upstream partition becoming full. This can potential propagate upstream to the sources of the distributed computation are reached. The windowing mechanism can also automatically restore the DAG representing the distributed computation back to its healthy state after the temporary performance bottleneck in the local computation of the downstream partition is removed.

Turning back to FIG. 4A, primary compute instance 401A includes compute state 411 and compute processing 421 that facilitate performing local computation 441. Local computation 441 can enqueue a message to sink queue 431. Sink queue 431 can includes a committed mark 441 indicating a location within sink queue 431. Messages after the location are committed messages and messages before the location are not yet committed (and thus could still be removed on an abort). Primary compute instance 401A is configured to send committed messages in sink queue 431 to primary compute instance 402A as part of a distributed computation.

Primary compute instance 402A includes compute state 412 and compute processing 422 that facilitate performing a local computation 442. Local computation 442 can dequeue a message from source queue 432. Primary compute instance 402A is configured to receive messages in source queue 432 from primary compute instance 401A as part of the distributed computation.

Embodiments of the invention include combinations of one or more stateful local computations and/or one or more stateless local computations interconnected with one another in a DAG representing a distributed computation.

Figure 8:
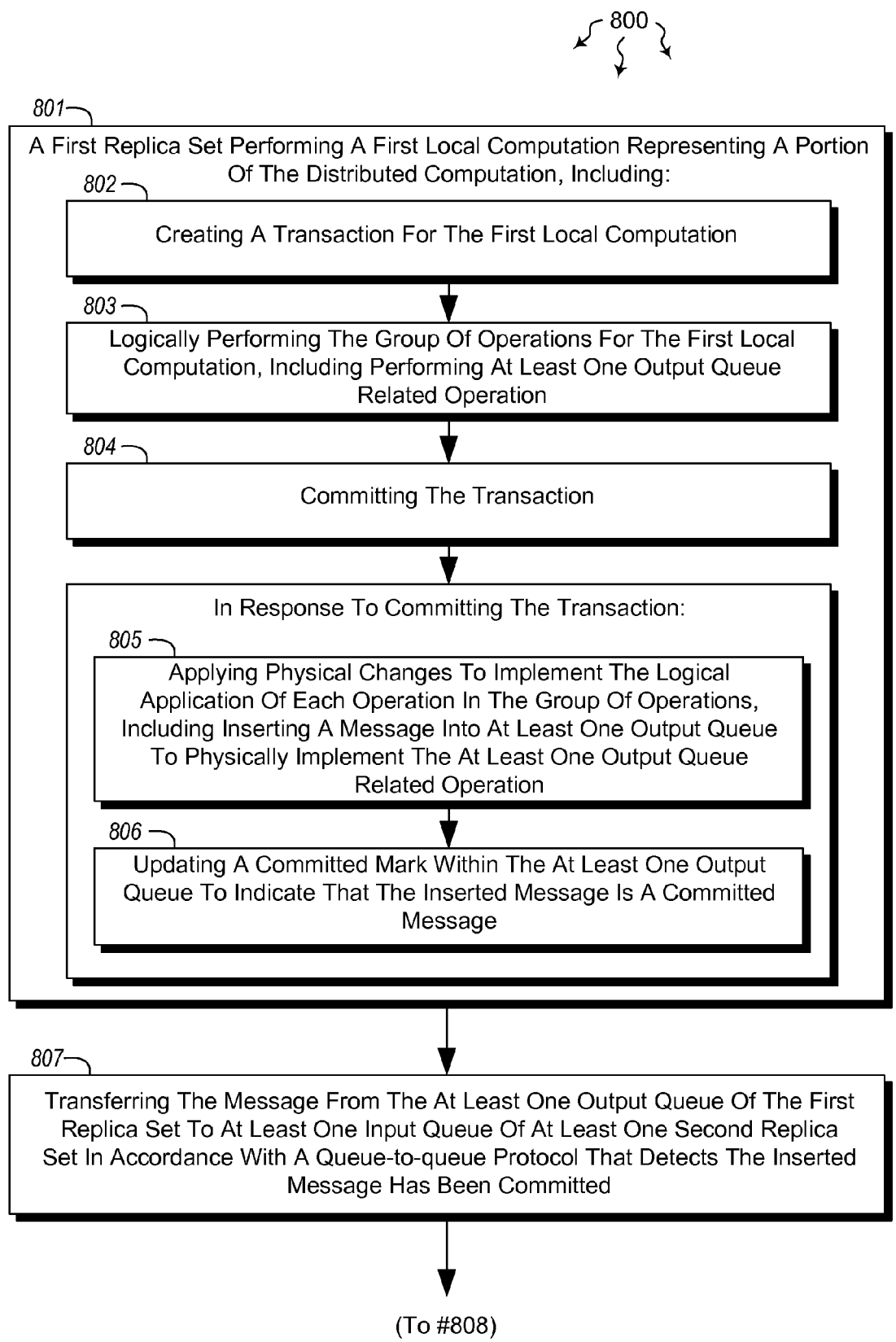
FIG. 8 illustrates a flow chart of an example method for performing a distributed computation.
Figure 8:
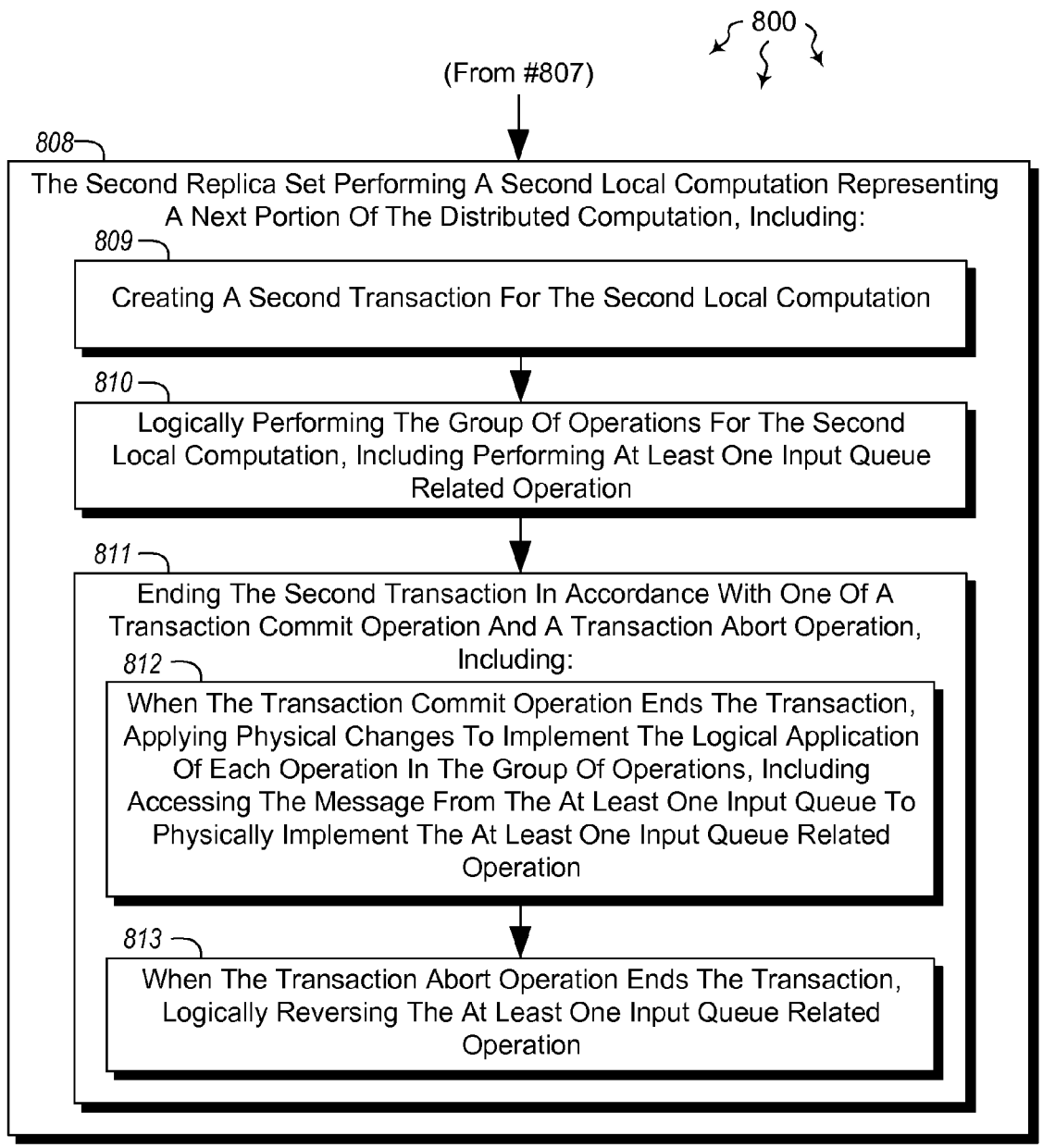

FIG. 8 illustrates a flow chart of an example method 800 for performing a distributed computation. Method 800 will be described with respect to the components and data of distributed computation architecture 400 in FIG. 4A.

Method 800 includes an act of a first replica set performing a first local computation representing a portion of the distributed computation (act 801). For example, replica set 491 can perform local computation 441 as part of distributed computation 499. Performing a first local computation includes an act of creating a transaction for the first local computation (act 802). For example, operations in compute processing 421 can create a transaction for local computation 441.

Performing a first local computation an act of logically performing the group of operations for the first local computation, including performing at least one output queue related operation (act 803). For example, primary compute instance 401A can logically perform a group of operations in compute processing 421. The group of operations can include enqueueing message 496 in sink queue 431.

Performing a first local computation includes an act of committing the transaction (act 804). For example, the transaction created for local computation 441 can be committed.

In response to committing the transaction, method 800 includes an act of applying physical changes to implement the logical application of each operation in the group of operations, including inserting a message into at least one output queue to physically implement the at least one output queue related operation (act 805). For example, primary compute instance 401A can apply physical changes to implement the logical application of operations in compute processing 421. Physical operations can include reconciling changed and/or new state with compute state 411 and physically enqueueing message 496 in sink queue 431.

Method 800 includes an act of updating a committed mark within the at least one output queue to indicate that the inserted message is a committed message (act 806). For example, primary compute node 401A can update committed mark 441 to indicate that message 496 is a committed message.

Method 800 includes an act of transferring the message from the at least one output queue of the first replica set to at least one input queue of at least one second replica set in accordance with a queue-to-queue protocol that detects the inserted message has been committed (act 807). For example, message 496 can be transferred from sink queue 431 to source queue 432 in accordance with queue to queue protocol (having a send end point at replica set 491 and a receive endpoint at replica set 492) that detects message 496 as committed.

Method 800 includes an act of the second replica set performing a second local computation representing a next portion of the distributed computation (act 808). For example, replica set 492 can perform local computation 442 as part of distributed computation 499. Method 800 includes an act of creating a second transaction for the second local computation (act 809). For example, operations in compute processing 421 can create a transaction for local computation 441.

Method 800 includes an act of logically performing the group of operations for the second local computation, including performing at least one input queue related operation (act 810). For example, primary compute instance 402A can logically perform a group of operations in compute processing 422. The group of operations can include dequeueing message 496 from source queue 432.

Method 800 includes an act of ending the second transaction in accordance with one of a transaction commit operation and a transaction abort operation (act 811). For example, the transaction created for local computation 441 can be ended in accordance with a transaction commit operation or a transaction abort operation.

Method 800 includes when the transaction commit operation ends the transaction, an act of applying physical changes to implement the logical application of each operation in the group of operations, including accessing the message from the at least one input queue to physically implement the at least one input queue related operation (act 812). For example, primary compute instance 402A can apply physical changes to implement the logical application of operations in compute processing 422. Physical operations can include reconciling changed and/or new state with compute state 412 and physically dequeueing message 496 from source queue 431.

Method 800 includes when the transaction abort operation ends the transaction, an act of logically reversing the at least one input queue related operation (act 813). For example, when a transaction abort ends the transaction from local computation 442, primary compute instance 402A can logically reverse the execution operations in compute processing 422. This can include reversing the logical dequeueing of message 491.

Figure 4B:
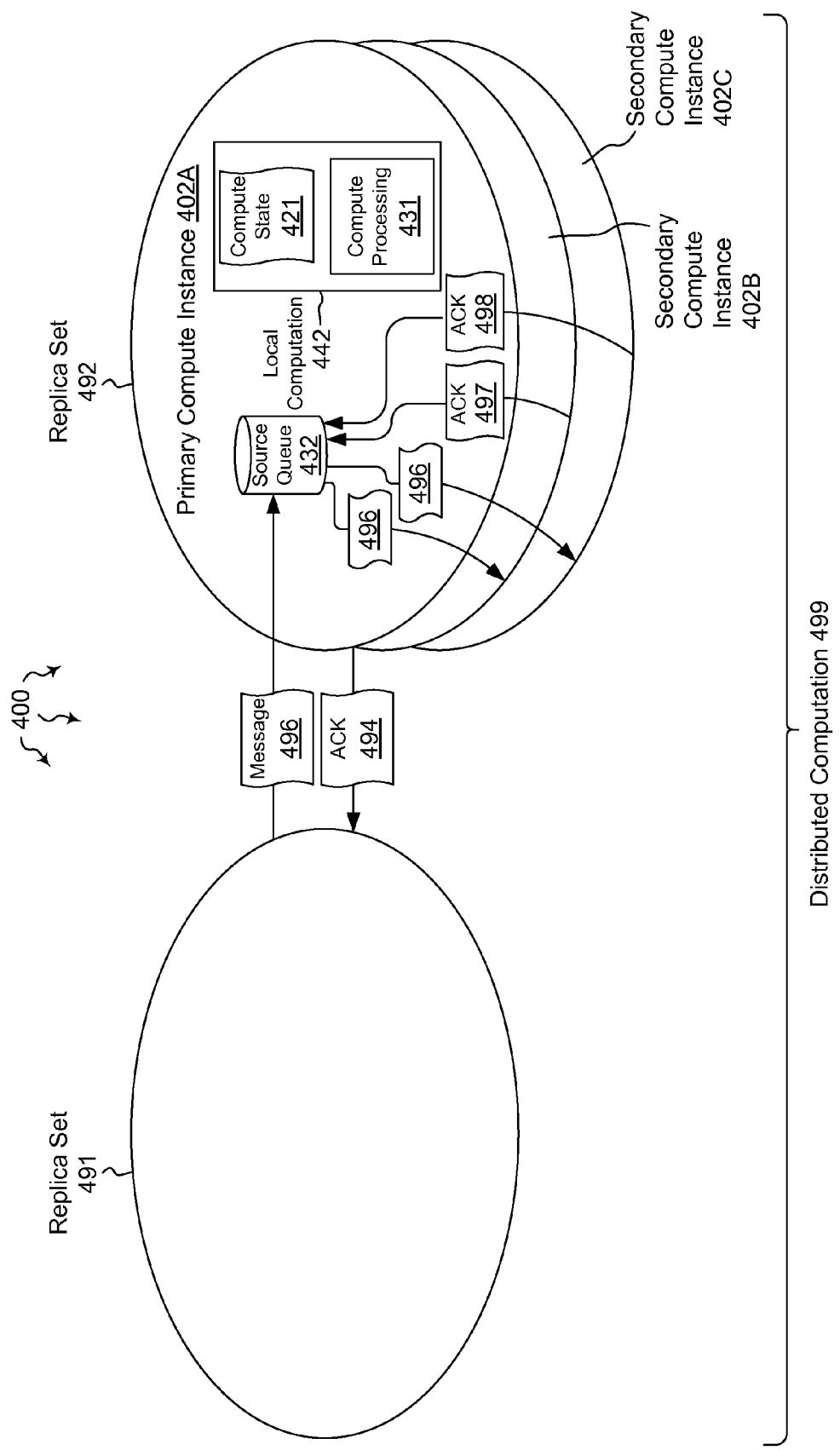
FIG. 4B illustrates the example distributed computation architecture of FIG. 4A that facilitates acknowledging a received message as part of a stateful distributed computation.

FIG. 4B illustrates distributed computation architecture 400 that facilitates acknowledging a received message as part of stateful distributed computation 499.

Figure 9:
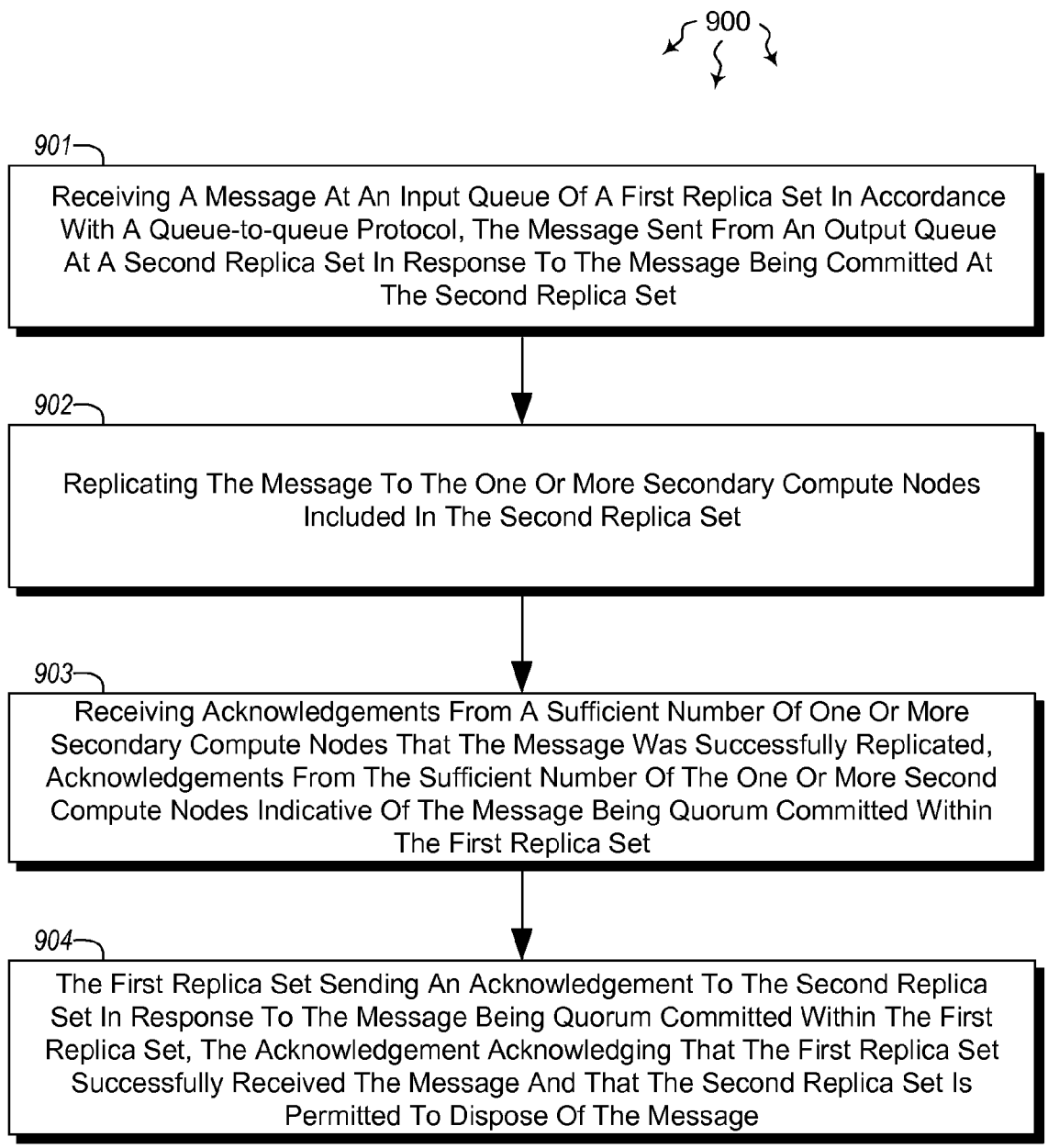
FIG. 9 illustrates a flow chart of an example method for acknowledging a received message as part of a stateful distributed computation.

FIG. 9 illustrates a flow chart of an example method 900 for acknowledging a received message as part of a stateful distributed computation. Method 900 will be described with respect to the components and data of distributed computation architecture 400 in FIG. 4B.

Method 900 includes an act of receiving a message at an input queue of a first replica set in accordance with a queue-to-queue protocol, the message sent from an output queue at a second replica set in response to the message being committed at the second replica set (act 901). For example, replica set 492 receives message 496 at sink queue 432 in accordance with a queue to queue protocol. Message 496 was sent from source queue 431 at replica set 491 in response to the message being committed at replica set 491.

Method 900 includes an act of replicating the message to the one or more secondary compute nodes included in the second replica set (act 902). For example, replica set 492 can replicate message 496 to secondary compute nodes 402B, 402C, etc.

Method 900 includes an act of receiving acknowledgements from a write quorum of the one or more secondary computer nodes that the message was successfully replicated, acknowledgements from the write quorum indicative of the message being quorum committed within the first replica set (act 903). For example, a write quorum (e.g., a simple majority or other designated threshold) of secondary compute instances 402B, 402C, etc. can send acknowledgments to primary compute instance 402A acknowledging receipt of message 496. For example, secondary compute instance 402B can send acknowledgement 497, secondary compute instance 402C can send acknowledgement 498, etc. Primary compute instance 402A can receive acknowledgments including acknowledgments 497, 498, etc., from the secondary compute nodes.

In some embodiments, a write quorum is defined as ceiling of $[(N+1)/2]$, N=replica count in the replica set. Thus, if a replica set had five secondary compute instances, at least three of the secondary computing instances would have to acknowledge a message to achieve write quorum.

Method 900 includes an act of the first replica set sending an acknowledgement to the second replica set in response to the message being quorum committed within the first replica set, the acknowledgement acknowledging that the first replica set successfully received the message and that the second replica set is permitted to dispose of the message (act 904). For example, replica set 492 can send acknowledgement 494 back to replica set 491 in response to a sufficient number of secondary compute nodes acknowledging receipt of message 496. Acknowledgment 494 indicates that replica set 492 successfully received message 496 and that replica set 491 is permitted to dispose of message 496.

Figure 5A:
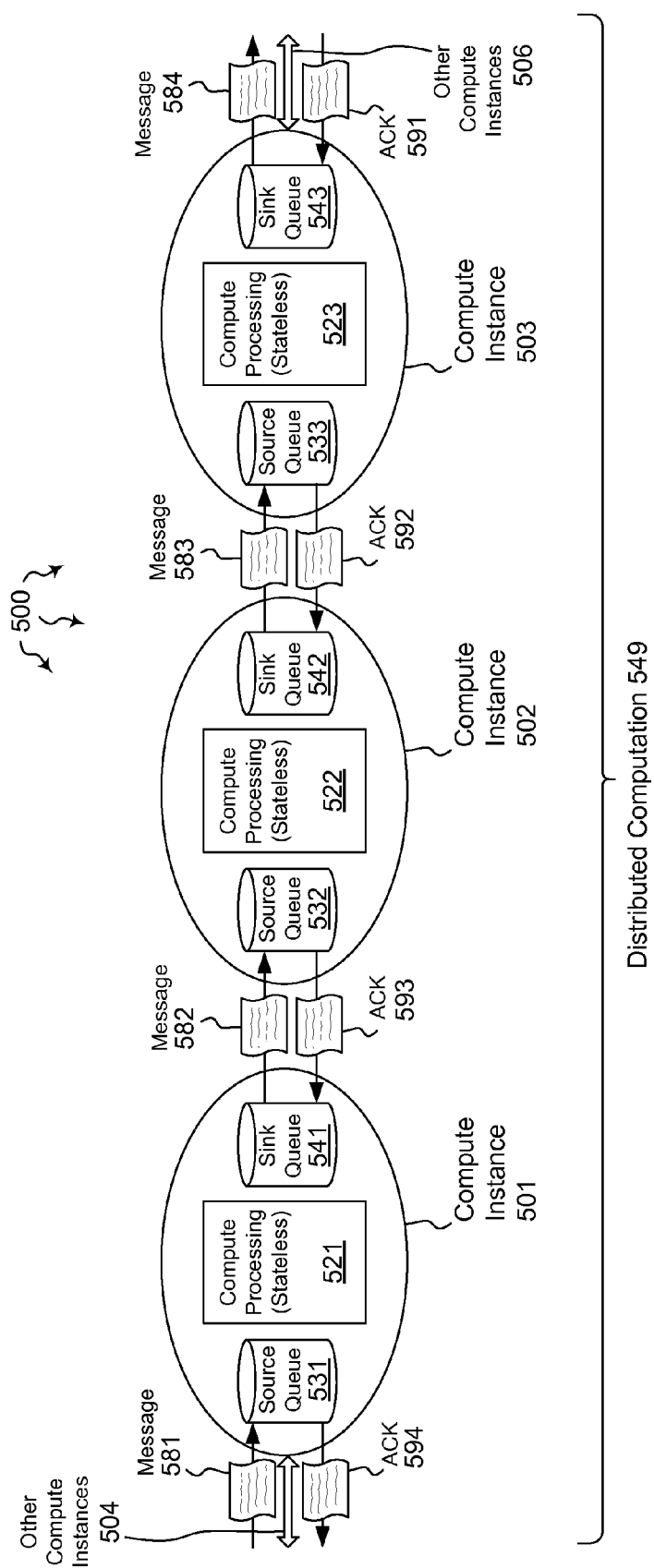
FIG. 5A illustrates an example distributed computation architecture that facilitates acknowledges messages between stateless local computations.

FIG. 5A illustrates distributed computation architecture 500 that facilitates acknowledges messages between stateless local computations. As depicted, distributed computation architecture 500 includes compute instances 501, 502, and 503 and other compute instances 504 and 506 for performing distributed computation 549. Compute instances 501, 502, and 503 include stateless compute processing 521, 522, and 523 respectively. Each of compute instances 501, 502, and 503 includes a source queue and a sink queue to facilitate the exchange of messages, for example, in accordance with a queue to queue protocol. Compute instance 501 includes source queue 531 and sink queue 541, compute instance 502 includes source queue 532 and sink queue 542, compute instance 503 includes source queue 533 and sink queue 543. Other compute instances 504 can precede (or are upstream from) compute instance 501. Other compute instances 506 can succeed (or are downstream from) compute instance 503.

Acknowledging a message sent between stateless local computations can differ from acknowledging a message sent between stateful local computations. For example, a stateless local computation can operate on a single compute instance (as opposed to a replica). As such, received messages are not replicated to secondary compute instances. Further, since stateless local computations can fail and restart (without replication), a failure can result in a received message being deleted at a compute instance. However, to restart, the stateless local computation may again need access to the message. Thus, the stateless local computation can re-request the message from an upstream compute instance. That is, if a downstream compute instance sends an acknowledgment upstream to early and then goes down and is restarted, further downstream compute instance can experience input loss Accordingly, in some embodiments, a stateless computation acknowledges input after the outputs that it has created based on those inputs are themselves acknowledged. Acknowledgment in this manner can be recursive, such as, for example, when a plurality of stateless local computations follows one another in a DAG.

Figure 10:
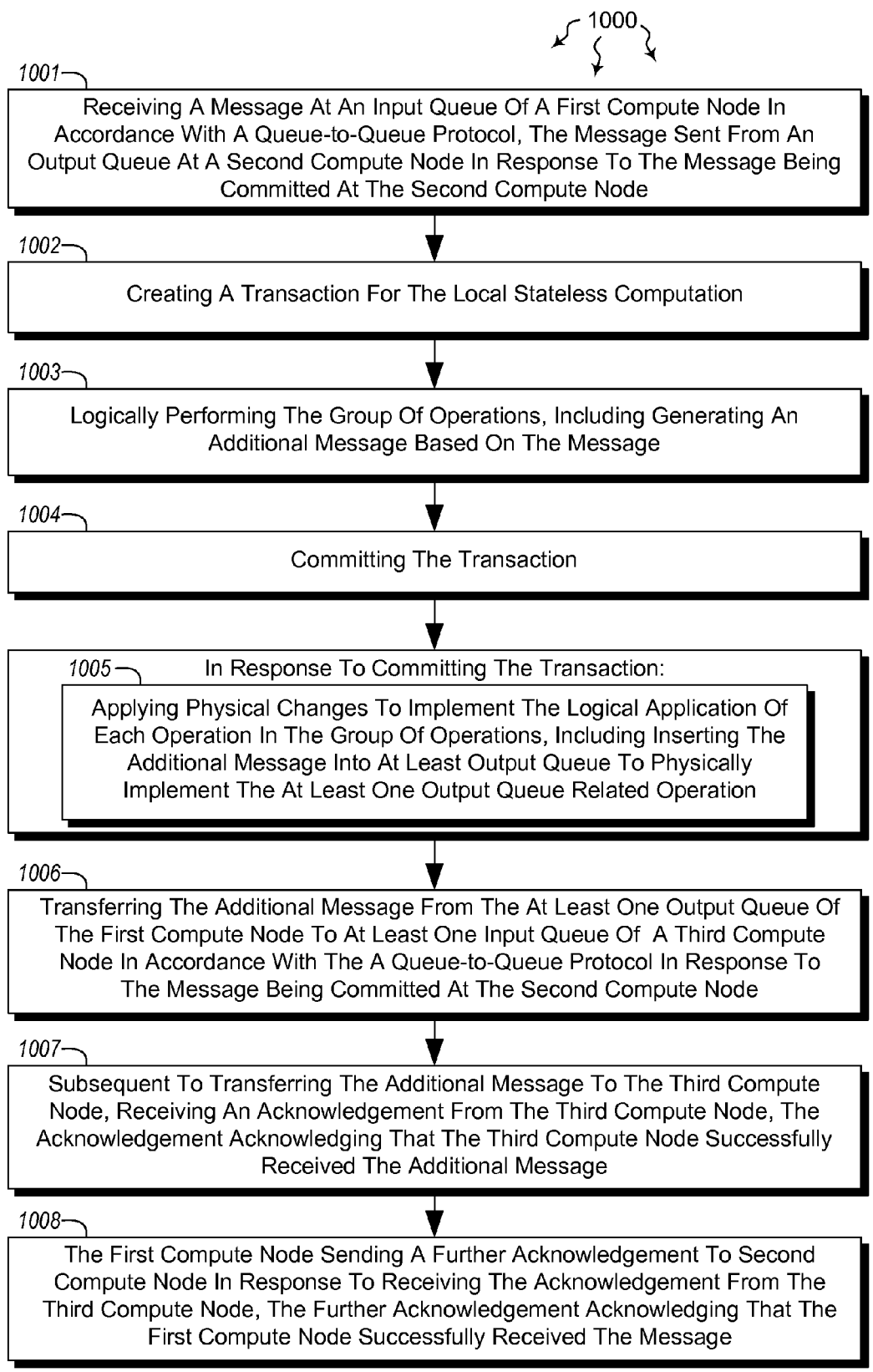
FIG. 10 illustrates a flow chart of an example method for acknowledging a received message as part of a stateless distributed computation.

FIG. 10 illustrates a flow chart of an example method 1000 for acknowledging a received message as part of a stateless distributed computation. Method 1000 will be described with respect to the components and data of distributed computation architecture 500.

Message 581 can be received in source queue 531 from other compute instances 504. Upon receiving message 581, compute instance 501 can perform compute processing 521. Performing compute processing 521 can cause message 582 to be enqueued in sink queue 541. Upon message 582 being committed, message 582 can be sent to compute instance 502.

Method 1000 includes an act of receiving a message at an input queue of a first compute node in accordance with a queue-to-queue protocol, the message sent from an output queue at a second compute node in response to the message being committed at the second compute node (act 1001). For example, source queue 532 can receive message 582 from sink queue 541 in accordance with a queue to queue protocol and in response to message 582 being committed at compute instance 501.

Method 1000 includes an act of the creating a transaction for the local stateless computation (act 1002). For example, compute instance 502 can create a transaction for compute processing 522. Method 1000 includes an act of logically performing the group of operations, including generating an additional message based on the message (act 1003). For example, compute instance 502 can logically perform a group of operations in compute processing 522. Logically performing the group of operations in compute processing 522 can include generating message 583 based on message 582. Method 1000 includes an act of committing the transaction (act 1004). For example, the transaction created for compute processing 522 can be committed.

In response to committing the transaction, method 1000 includes an act of applying physical changes to implement the logical application of each operation in the group of operations, including inserting the additional message into at least output queue to physically implement the at least one output queue related operation (act 1005). For example, in response to committing the transaction for compute processing 522, compute instance 502 can apply physical operations to implement the logically performed operations. Applying physical operations can include enqueueing message 583 in sink queue 542.

Method 1000 includes an act of transferring the additional message from the at least one output queue of the first compute node to at least one input queue of a third compute node in accordance with the queue-to-queue protocol in response to the message being committed at the second compute node (act 1006). For example, message 583 can be transferred from sink queue 542 to source queue 533 in accordance with the queue to queue protocol in response to message 583 being committed at sink queue 542.

Upon receiving message 583, compute instance 503 can perform compute processing 523 and transfer message 584 onto other compute instances 506. Eventually, due to reaching an end compute instance (or a stateful local computation), compute instance 502 can receive acknowledgement 591 for message 584. In turn, compute instance 503 can send acknowledgement 592 to compute instance 502. Acknowledgement 592 indicates that compute instance 503 successfully received message 583 and that compute instance 502 is permitted to dispose of message 583.

Method 1000 includes an act of, subsequent to transferring the additional message to the third compute node, receiving an acknowledgement from the third compute node, the acknowledgement acknowledging that the third compute node successfully received the additional message (act 1007). For example, compute instance 502 can receive acknowledgement 592 subsequent to sending message 583 to compute instance 503.

Method 1000 includes an act of the first compute node sending a further acknowledgement to second compute node in response to receiving the acknowledgement from the third compute node, the further acknowledgement acknowledging that the first compute node successfully received the message (act 1008). For example, compute instance 502 can send acknowledgment 593 to compute instance 501. Acknowledgment 593 indicates that compute instance 502 successfully received message 582 and that compute instance 501 is permitted to dispose of message 582.

Compute instance 501 can then send acknowledgment 594 upstream to other compute instances 504 as appropriate.

In some embodiments, one or more stateless local computations are included between a downstream stateful local computation and an upstream stateful local computation. The stateful local computations can be used to mitigate the possibilities of input loss and/or input duplication. For example, in computer architecture 500 a stateful local computation can be included in other compute instances 504 and in other compute instances 506.

Figure 5B:
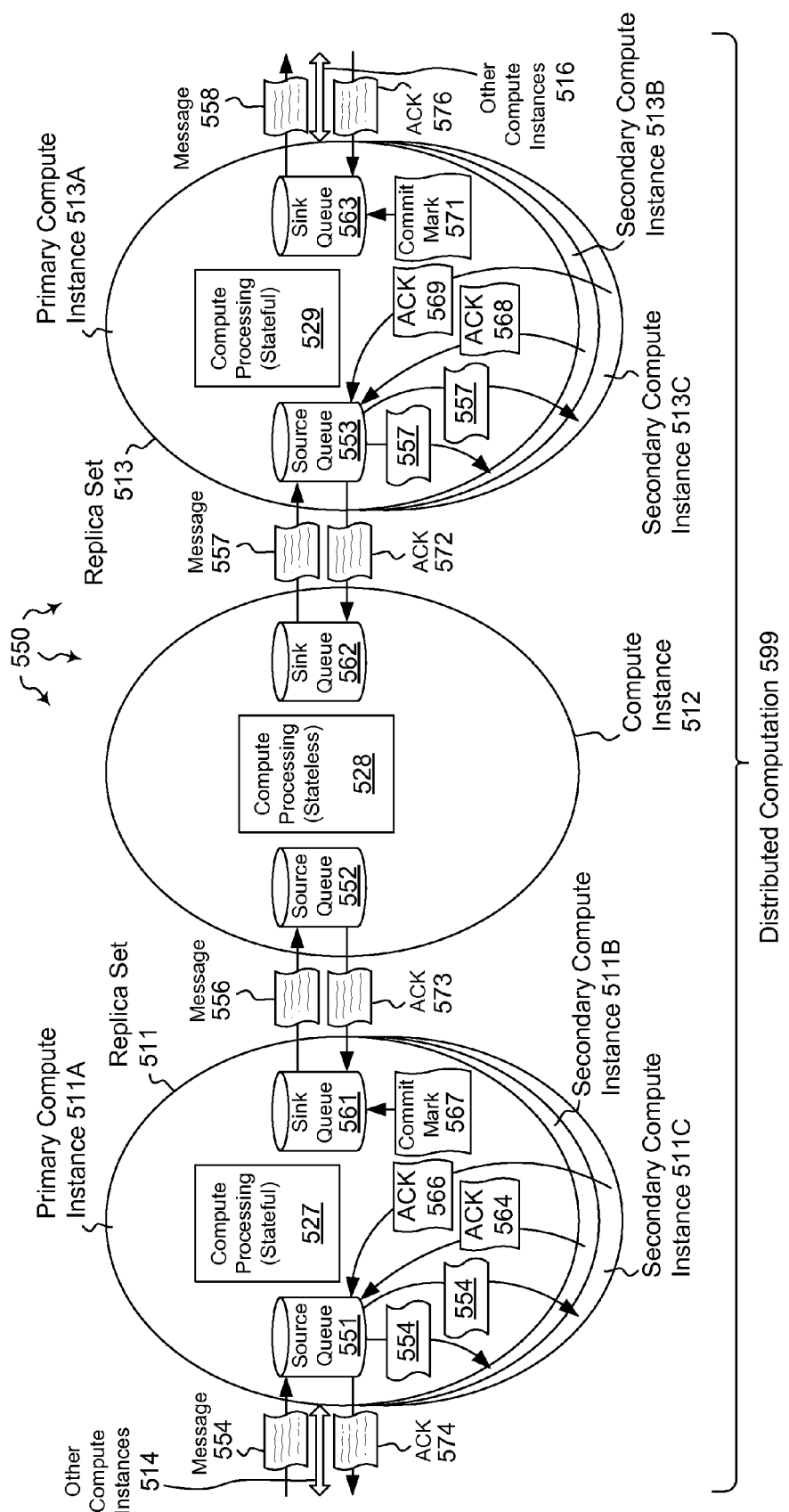
FIG. 5B illustrates an example distributed computation architecture that facilitates acknowledging messages sent between stateless and stateful local computations to mitigate the possibility of input loss.

FIG. 5B illustrates an example distributed computation architecture 550 that facilitates acknowledging messages sent between stateless and stateful local computations to mitigate the possibility of input loss. As depicted, distributed computation architecture 550 includes replica set 511, compute instance 502, and replica set 513 and other compute instances 514 and 516 for performing distributed computation 599. Replica set 511 includes primary compute instance 511A and secondary compute instances 511B and 511C. Replica set 513 includes primary compute instance 513A and secondary compute instances 513B and 513C.

Primary compute instance 511A includes stateful compute processing 527. Compute instance 512 includes stateless compute processing 528. Primary compute instance 513A includes stateful compute processing 529.

Each of primary compute instance 511A, compute instance 502, and primary compute instance 513A includes a source queue and a sink queue to facilitate the exchange of messages, for example, in accordance with a queue to queue protocol. Primary Compute instance 511A includes source queue 551 and sink queue 561, Compute instance 502 includes source queue 552 and sink queue 562. Primary compute instance 513A includes source queue 553 and sink queue 563. Other compute instances 514 can precede (or are upstream from) replica set 511. Other compute instances 505 can succeed (or are downstream from) replica set 513.

Message 554 can be received in source queue 551 from other compute instances 554. Upon receiving message 554, primary compute instance 511A, replicates message 554 to secondary compute instance 511B and 511C. Secondary compute instances 511B and 511C (a write quorum) can acknowledge receipt of message 554 by sending acknowledgments 564 and 566 respectively to primacy computer instance 511A. Primary compute instance 511A can send acknowledgement 574 back to other computer instances 514 in response to message 554 being quorum committed. Acknowledgment 575 indicates that replica set 511 successfully received message 554 and that other computer instances 514 are permitted to dispose of message 554.

Compute processing 527 can execute, generating message 556 and enqueue message 556 in sink queue 553. Sink queue 561 includes committed mark 567 indicating a location within sink queue 561. Messages after the location are committed messages and messages before the location are not yet committed (and thus could still be removed on an abort). Primary compute instance 511A is configured to send committed messages in sink queue 553 to compute instance 512 as part of distributed computation 599.

Source queue 552 can receive message 556 from sink queue 561 in accordance with a queue to queue protocol and in response to message 561 being committed at primary compute instance 511A. Compute processing 528 can be performed to cause message 557 to be enqueued in sink queue 562. Upon message 557 being committed, message 557 can be sent to primary compute instance 513A. Message 557 can be transferred from sink queue 562 to source queue 553 in accordance with the queue to queue protocol in response to message 557 being committed at sink queue 562. Compute instance 511 is configured to send committed messages in sink queue 562 to primary compute instance 513A as part of distributed computation 599.

As previously described, compute instance 512 (which contains compute processing 528, a stateless local operation) may not immediately acknowledge receipt of message 556.

Message 557 can be received in source queue 553 from compute instance 512. Upon receiving message 557, primary compute instance 513A, replicates message 557 to secondary compute instance 513B and 513C. Secondary compute instances 513B and 513C (a write quorum) can acknowledge receipt of message 557 by sending acknowledgments 568 and 569 respectively to primary compute instance 511A. Primary compute instance 513A can send acknowledgement 572 back to other compute instance 512 in response to message 557 being quorum committed.

Acknowledgment 572 indicates that replica set 513 successfully received message 557 and that compute instance 512 is permitted to dispose of message 557. In response to acknowledgment 572, compute instance 512 can then send acknowledgment 573 upstream to primary compute instance 511A. Acknowledgment 573 indicates that compute instance 512 successfully received message 556 and that primary compute instance 511A is permitted to dispose of message 556.

Compute processing 529 can also execute, generating message 558 and enqueue message 558 in sink queue 533. Sink queue 563 includes committed mark 571 indicating a location within sink queue 563. Messages after the location are committed messages and messages before the location are not yet committed (and thus could still be removed on an abort). Primary compute instance 513A is configured to send committed messages in sink queue 563 to other computer instances 516 as part of distributed computation 599. Primary compute instance 513A can eventually receive back acknowledgment 576 for message 558 from other compute instances 516.

Figure 5C:
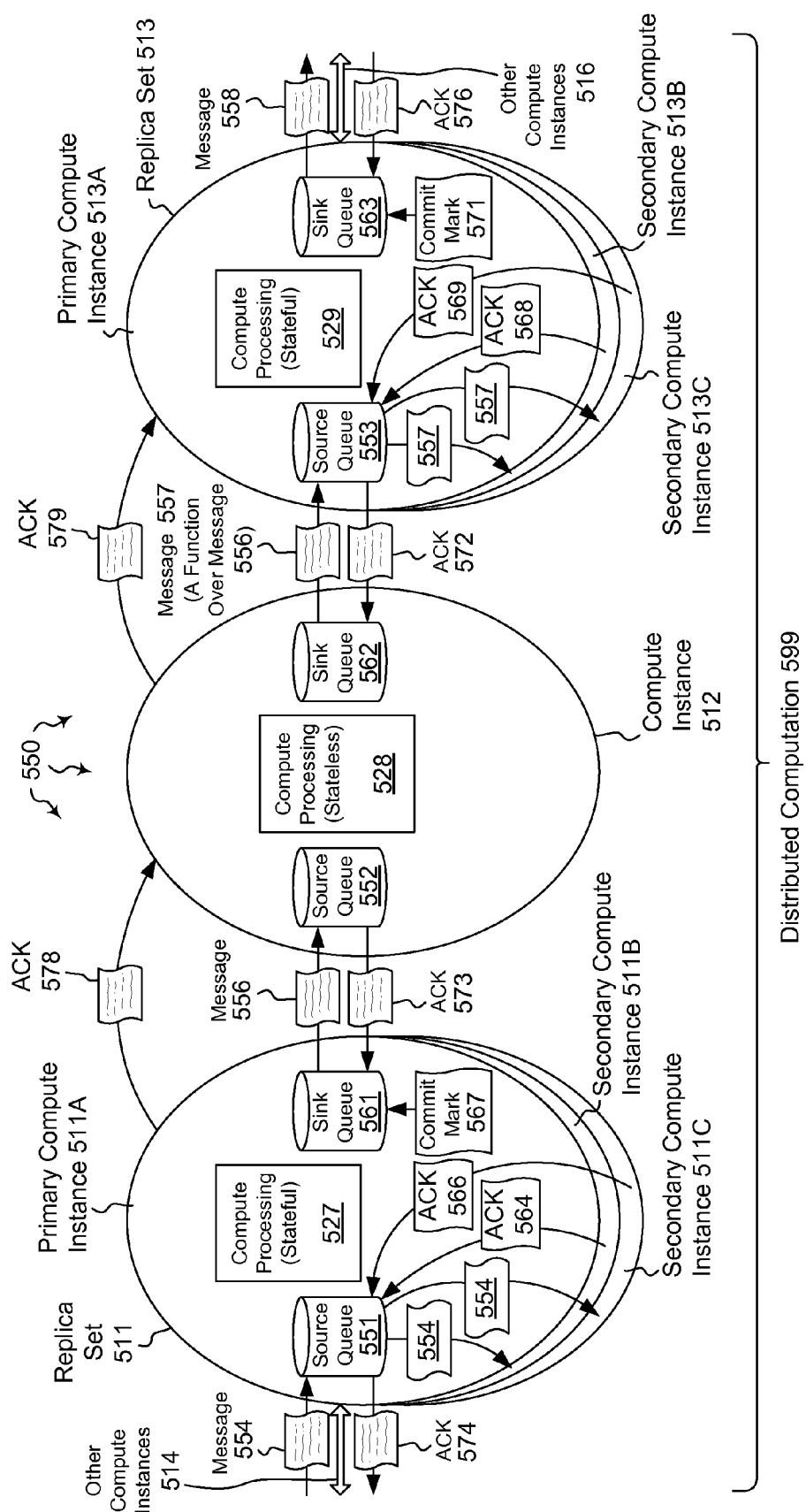
FIG. 5C illustrates the example distributed computation architecture that facilitates acknowledging messages sent between stateless and stateful local computations to mitigate the possibility of input loss and to mitigate the possibility of input duplication.

FIG. 5C illustrates example distributed computation architecture 550 that facilitates acknowledging messages sent between stateless and stateful local computations to mitigate the possibility of input loss and to mitigate the possibility of input duplication.

As depicted in FIG. 5C, message 557 is a function over message 556 with unique properties. For example, an identifier can be attached to message 557. The identifier can be constructed from an identifier for replica set 511, an identifier for sink queue 561, and a monotonically increasing sequence number. An identifier or other unique properties enable primary compute instance 513A to tell when it receives a duplicate of message 557 (i.e., another message generated from message 556). Acknowledgements, such as, for example, ACK 573, can contain the unique attachments (identifiers) of the messages they acknowledge.

Further, upon receiving ACK 573, primary compute instance 511A is made aware that it can dispose of message 556. Primary computer instance 511A acknowledges that it is aware that it can dispose of message by sending ACK 578 to compute instance 512. As such, ACK 578 essentially acknowledges that primary compute instance 511A received ACK 573.

Upon receiving ACK 578, compute instance 512 is made aware that replica set 511 is aware that replica set 511 can dispose of message 556. As such, compute instance 512 is also made aware that it can no longer generate message 557 (since replica set 511 has disposed of message 556). Compute instance 512 acknowledges that it can no longer generate message 557 by sending ACK 579 to replica set 513. As such, ACK 579 essentially acknowledges that compute instance 512 received ACK 572.

Primary compute instance 513A retains message 557 until receiving ACK 579. Retaining message 557 permits primary computer instance 513A to detect when a further input message is a duplicate of message 557. However, after receiving ACK 579, primary compute instance 513A is made aware that compute instance 512 can no longer send message 557 (since compute instance 512 has no further access to message 556).

If ACK 578 is lost (e.g., compute processing 528 dies before sending ACK 579), upon the restart of compute processing 528, it is possible for compute processing 527 to receive ACK 573 again since compute processing 529 did not receive ACK 579. Although compute processing 527 may no longer have message 556, compute processing 527 considers ACK 573 a duplicate and a noop As described, embodiments of the invention include a general purpose distributed computation infrastructure that can be used to perform efficient (in-memory), scalable, failure-resilient, atomic, flow-controlled, long-running state-less and state-full distributed computations. Guarantees provided by a distributed computation infrastructure can build upon existent guarantees of an underlying distributed fabric (e.g., neighborhood and routing consistency, perfect failure detection, and data consistent replication and failover reconfigurations) in order to hide the complexities of fault-tolerance, enable large scale highly available processing, allow for efficient resource utilization, and facilitate generic development of stateful and stateless computations. A distributed computation infrastructure can also provide a substrate on which existent distributed computation models can be enhanced to become failure-resilient.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a fabric based distributed computing architecture including one or more processors and system memory, the distributed computing architecture including a first replica set and at least one second replica set, a method for performing a distributed computation, the method including:
   the first replica set performing a first local computation representing a portion of the distributed computation, including:
      logically performing a group of operations for the first local computation, including performing at least one output queue related operation;
      applying physical changes to implement the logical application of each operation in the group of operations, including inserting a message into at least one output queue to physically implement the at least one output queue related operation; and
      updating a committed mark within the at least one output queue to indicate that the inserted message is a committed message;
   transferring the message from the at least one output queue of the first replica set to at least one input queue of the at least one second replica set in accordance with a queue-to-queue protocol that detects the inserted message has been committed; and
   the second replica set performing a second local computation representing a next portion of the distributed computation, including:
      logically performing the group of operations for the second local computation, including performing at least one input queue related operation; and
      ending the second transaction in accordance with one of a transaction commit operation or a transaction abort operation.

2. The method as recited in claim 1, further comprising creating a transaction for the first local computation.

3. The method as recited in claim 2, further comprising committing the transaction after logically performing the group of operations for the first local computation.

4. The method as recited in claim 3, wherein applying physical changes to implement the logical application of each operation in the group of operations and updating the committed mark are performed in response to committing the transaction.

5. The method as recited in claim 1, further comprising creating a transaction for the second local computation.

6. The method as recited in claim 1, wherein ending the second transaction in accordance with one of a transaction commit operation or a transaction abort operation includes, when the transaction commit operation ends the transaction, applying physical changes to implement the logical application of each operation in the group of operations, including accessing the message from the at least one input queue to physically implement the at least one input queue related operation.

7. The method as recited in claim 1, wherein ending the second transaction in accordance with one of a transaction commit operation or a transaction abort operation includes, when the transaction abort operation ends the transaction, logically reversing the at least one input queue related operation.

8. A computer program product for use at a fabric based distributed computing architecture, the distributed computing architecture including a first replica set and at least one second replica set, the computer program product comprising one or more physical storage devices having stored thereon computer-executable instructions that, when executed by one or more processors of a computer system, cause the computer system to perform a distributed computation, including the following:
   the first replica set performing a first local computation representing a portion of the distributed computation, including:
      logically performing a group of operations for the first local computation, including performing at least one output queue related operation;
      applying physical changes to implement the logical application of each operation in the group of operations, including inserting a message into at least one output queue to physically implement the at least one output queue related operation; and
      updating a committed mark within the at least one output queue to indicate that the inserted message is a committed message;
   transferring the message from the at least one output queue of the first replica set to at least one input queue of the at least one second replica set in accordance with a queue-to-queue protocol that detects the inserted message has been committed; and
   the second replica set performing a second local computation representing a next portion of the distributed computation, including:
      logically performing the group of operations for the second local computation, including performing at least one input queue related operation; and
      ending the second transaction in accordance with one of a transaction commit operation or a transaction abort operation.

9. The computer program product as recited in claim 8, further comprising creating a transaction for the first local computation.

10. The computer program product as recited in claim 9, further comprising committing the transaction after logically performing the group of operations for the first local computation.

11. The computer program product as recited in claim 10, wherein applying physical changes to implement the logical application of each operation in the group of operations and updating the committed mark are performed in response to committing the transaction.

12. The computer program product as recited in claim 8, wherein ending the second transaction in accordance with one of a transaction commit operation or a transaction abort operation includes, when the transaction commit operation ends the transaction, applying physical changes to implement the logical application of each operation in the group of operations, including accessing the message from the at least one input queue to physically implement the at least one input queue related operation.

13. The computer program product as recited in claim 8, wherein ending the second transaction in accordance with one of a transaction commit operation or a transaction abort operation includes, when the transaction abort operation ends the transaction, logically reversing the at least one input queue related operation.

14. A computer system, including:
one or more hardware processors;
system memory; and
one or more hardware storage devices having stored thereon computer-executable instructions that, when executed by the one or more processors, cause the computer system to perform a method for performing a distributed computation, including:
   the first replica set performing a first local computation representing a portion of the distributed computation, including:
      logically performing a group of operations for the first local computation, including performing at least one output queue related operation;
      applying physical changes to implement the logical application of each operation in the group of operations, including inserting a message into at least one output queue to physically implement the at least one output queue related operation; and
      updating a committed mark within the at least one output queue to indicate that the inserted message is a committed message;
   transferring the message from the at least one output queue of the first replica set to at least one input queue of the at least one second replica set in accordance with a queue-to-queue protocol that detects the inserted message has been committed; and
   the second replica set performing a second local computation representing a next portion of the distributed computation, including:
      logically performing the group of operations for the second local computation, including performing at least one input queue related operation; and
      ending the second transaction in accordance with one of a transaction commit operation or a transaction abort operation.

15. The computer system as recited in claim 14, further comprising creating a transaction for the first local computation.

16. The computer system as recited in claim 15, further comprising committing the transaction after logically performing the group of operations for the first local computation.

17. The computer system as recited in claim 16, wherein applying physical changes to implement the logical application of each operation in the group of operations and updating the committed mark are performed in response to committing the transaction.

18. The computer system as recited in claim 14, further comprising creating a transaction for the second local computation.

19. The computer system as recited in claim 14, wherein ending the second transaction in accordance with one of a transaction commit operation or a transaction abort operation includes, when the transaction commit operation ends the transaction, applying physical changes to implement the logical application of each operation in the group of operations, including accessing the message from the at least one input queue to physically implement the at least one input queue related operation.

20. The computer system as recited in claim 14, wherein ending the second transaction in accordance with one of a transaction commit operation or a transaction abort operation includes, when the transaction abort operation ends the transaction, logically reversing the at least one input queue related operation.

* * * * *